US012795714B2

(12) United States Patent
Nalam et al.

(10) Patent No.: US 12,795,714 B2
(45) Date of Patent: Nov. 10, 2026

(54) PRIVATE CLOUD NETWORK FUNCTION DEPLOYMENT

(71) Applicant: Boost SubscriberCo L.L.C., Englewood, CO (US)

(72) Inventors: Santosh Nalam, Littleton, CO (US); Sri Harsha Vadlamudi, Littleton, CO (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 390 days.

(21) Appl. No.: 18/532,252

(22) Filed: Dec. 7, 2023

(65) Prior Publication Data

US 2025/0193919 A1 Jun. 12, 2025

(51) Int. Cl.
*H04W 72/543* (2023.01)
*H04W 72/0446* (2023.01)

(52) U.S. Cl.
CPC ...... *H04W 72/543* (2023.01); *H04W 72/0446* (2013.01)

(58) Field of Classification Search
CPC ........... H04W 72/543; H04W 72/0446; H04W 24/02; H04W 88/085; H04L 41/0843; H04L 41/5048
See application file for complete search history.

(56) References Cited

U.S. PATENT DOCUMENTS

2019/0149408 A1* 5/2019 Li .......................... H04L 41/40 709/223
2023/0224257 A1* 7/2023 Deviprasad ........... H04L 47/828 709/226
2023/0254223 A1* 8/2023 Boulos .................. H04W 28/06 370/328
2023/0275814 A1* 8/2023 Gupta ................. G06F 3/04847 715/735
2023/0379221 A1* 11/2023 Draznin .................. H04L 41/40
2024/0414582 A1* 12/2024 Taneja .............. H04W 28/0268

* cited by examiner

*Primary Examiner* — Sharmin Chowdhury
(74) *Attorney, Agent, or Firm* — Seed Intellectual Property Law Group LLP

(57) ABSTRACT

A repository is generated in a cloud network and is configured to receive templates for deploying containerized network functions onto different cloud platforms having different infrastructures. A standardized template is generated by filtering data acquired from each template to obtain specific data for use in deployment. The standardized template contains data that defines the network functions with respect to infrastructure of each of the cloud platforms, respectively. In response to a request to deploy at least one network function of the network functions onto a specified cloud platform of the different cloud platforms, the network functions are deployed using the generated standardized template.

18 Claims, 17 Drawing Sheets

PRIVATE CLOUD NETWORK FUNCTION DEPLOYMENT

BACKGROUND

Cloud computing is the practice of using a network of remote servers hosted on the Internet to store, manage, and process data, rather than using a local server or a personal computer. Demand for cloud computing continues to grow as customers access new services and applications.

Radio access networks (RANs) are an important element in mobile cellular communication networks on which cloud computing services are implemented. Cloud providers offering cloud computing services on RANs typically charge for these services based on usage. To remain competitive, telecommunications companies must cost-effectively expand their networks while also improving user experience in the use of cloud computing services. As the data requirements of customers increase and become more diverse, the ability to efficiently and cost-effectively deploy a customer's cloud network functions in a cloud computing environment becomes more critical.

SUMMARY

Various embodiments provide solutions by providing systems and methods for deploying network functions, in accordance with a request by a number of different sources (e.g., customers, vendors, organizations, clients, etc.), onto a public cloud of a cellular network, such as a 5G network. A template describing the cloud infrastructure is designed for deploying the network functions onto a cloud platform, via a pipeline, without the need to individually deploy each network function requested by each source.

In such embodiments, a system of one or more computers on the cellular network can be configured to perform particular operations or actions by virtue of having software, firmware, hardware, or a combination of them installed on the system and which in operation, causes or causes the system to perform the actions. One or more computer programs can be configured to perform particular operations or actions by virtue of including instructions that, when executed by a data processing apparatus, cause the apparatus to perform the actions.

One general aspect includes a method implemented on a public cloud of a cellular network. The method includes generating a repository on the public cloud, the repository being configured to receive templates. The method also includes receiving the templates in the repository, each template defining at least one network function. Furthermore, the method includes acquiring, from each of the templates, data that defines the at least one network function with respect to infrastructure of at least one of multiple different cloud platforms. Additionally, the method includes generating a standardized template based on the data acquired from the templates, where the standardized template contains code for deploying the at least one network function onto the cloud platform, within the public cloud. The method also includes where the standardized template is generated by an application running on a radio access network (RAN) node of the cellular network. Implementation of the method may occur in the RAN node, which includes (i) a central unit (CU) that resides on the public cloud of the cellular network, (ii) a distributed unit (DU) that resides on a private cloud of the cellular network such that the DU is in communication with the CU on the public cloud of the cellular network, and (iii) a radio unit (RU) under control of the DU. Other embodiments of this aspect include corresponding computer systems, apparatus, and computer programs recorded on one or more computer storage devices, each configured to perform the actions of the methods.

In another aspect, the method may include: receiving a request to deploy at least one network function of the network functions onto a cloud platform of the cloud platforms; and deploying the at least one network function onto the cloud platform based on the data that defines the at least one network function. Implementations may include one or more of the following features, including where the cellular network is a 5G cellular network, and the standardized template is cloud agnostic. Additionally, the method may include designing the standardized template containing the data that defines the at least one network function for deployment of the at least one network function onto a first cloud platform, and designing the standardized template containing the data that defines the at least one network function for deployment of the at least one network function on a second cloud platform, which is different from the first cloud platform. The method may further include generating the standardized template by integrating the at least one network function into a single pipeline that is configured to connect to any of the cloud platforms, including a first cloud platform and a second cloud platform. Furthermore, the method may include deploying the at least one network function onto the first cloud platform via the single pipeline, and deploying the at least one network function onto the second cloud platform via the single pipeline, where the second cloud platform is different from the first cloud platform. Implementations may include one or more of the following features, including where the at least one network function is a containerized network function, the received requests include requests to deploy different types of network functions, which may include at least one of a voice service, a short messaging service (SMS); a video streaming service; and a voice messaging service. Implementations of the described techniques may include hardware, a method or process, or computer software on a computer-accessible medium.

Another general aspect includes a cellular network including RAN nodes, where each RAN node includes (i) a CU that resides on a public cloud of the cellular network, (ii) a DU that resides on a private cloud of the cellular network such that the DU is in communication with the CU on the public cloud of the cellular network, and (iii) an RU under control of the DU. The network also includes applications configured to run on the RAN node of the cellular network. In the network, the public cloud may include cloud servers with processors and store computer-executable instructions that execute a process. The process may include generating a repository on the public cloud, where the repository is configured to receive templates. The process may also include receiving the plurality of templates in the repository, each template defining at least one network function. The process may further include acquiring, from each of the templates, data that defines the at least one network function with respect to infrastructure of one or more different cloud platforms. Additionally, the process may include generating a standardized template based on the data acquired from the templates, where the standardized template contains code for deploying the at least one network function onto the one or more cloud platforms within the public cloud. Moreover, in the cellular network, the standardized template may be generated by an application running on the RAN node of the cellular network. Other embodiments of this aspect include corresponding computer systems, apparatus, and computer programs recorded on one or more computer storage devices, each configured to perform the actions of the methods.

In another aspect of the cellular network, the process may include: receiving a request to deploy at least one network function of the network functions onto a cloud platform; and deploying the at least one network function onto the cloud platform based on the data that defines the at least one network function. Implementations may include where the cellular network is a 5G network, and the standardized template is cloud agnostic. Furthermore, in yet another aspect of the cellular network, the process may include: designing the standardized template containing the data that defines the at least one network function for deployment of the at least one network function on a first cloud platform; and designing the standardized template containing the data that defines the at least one network function for deployment of the at least one network function on a second cloud platform, which is different from the first cloud platform. In yet another aspect of the cellular network, the process may further include: generating the standardized template by integrating the at least one network function into a single pipeline that is configured to connect to any of the cloud platforms, which include a first cloud platform and a second cloud platform, the first cloud platform being different from the second cloud platform. In addition, the process may include deploying the at least one network function onto the first cloud platform via the single pipeline, and deploying the at least one network function onto the second cloud platform, which is different from the first cloud platform. Implementations may include one or more of the following features, including where the at least one network function is a containerized network function, the received requests include requests to deploy different types of network functions, which may include at least one of a voice service; a short messaging service (SMS); a video streaming service; and a voice messaging service. Implementations of the described techniques may include hardware, a method or process, or computer software on a computer-accessible medium.

Yet another general aspect includes a cellular network including RAN nodes, where each RAN node includes (i) a CU that resides on a public cloud of the cellular network, (ii) a DU that resides on a private cloud of the cellular network such that the DU is in communication with the CU on the public cloud of the cellular network, and (iii) an RU under control of the DU. The network also includes applications configured to run on the RAN node of the cellular network. In the network, the public cloud may include cloud servers with processors and store computer-executable instructions that execute a process. The process may include generating a repository on the public cloud, the repository being configured to receive first templates, where each of the first templates respectively defines a network function with respect to infrastructure of at least one of a plurality of cloud platforms. Each of the first templates also respectively contains data for deploying the network function onto the at least one of the cloud platforms. Additionally, the process may further include analyzing the plurality of first templates to identify specific data required for deploying respective network functions. Furthermore, the process may include acquiring, from each of the plurality of first templates, the specific data for deploying the respective network functions. Further, the process may include generating a second template containing target data that defines the at least one network function with respect to the infrastructure of the cloud platform and code for deploying the network functions onto different cloud platforms within the public cloud, where the second template is a standardized template derived from the specific data acquired from the first templates and defining the network functions with respect to the infrastructure of each of the plurality of cloud platforms, respectively, and where the second template may be generated by an application running on the RAN node of the cellular network. The process may also include receiving a request to deploy at least one network function of the network functions onto one or more cloud platforms. Also, the process may include acquiring, from the second template, the target data that defines the at least one network function with respect to the infrastructure of the cloud platform, and deploying the at least one network function onto the cloud platform based on the target data that defines the at least one network function. Implementations may include where the cellular network is a 5G network. Furthermore, other embodiments of this aspect include corresponding computer systems, apparatus, and computer programs recorded on one or more computer storage devices, each configured to perform the actions of the methods, and implementations of the described techniques may include hardware, a method or process, or computer software on a computer-accessible medium.

BRIEF DESCRIPTION OF THE DRAWINGS

Aspects of the present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS

Figure 1A:
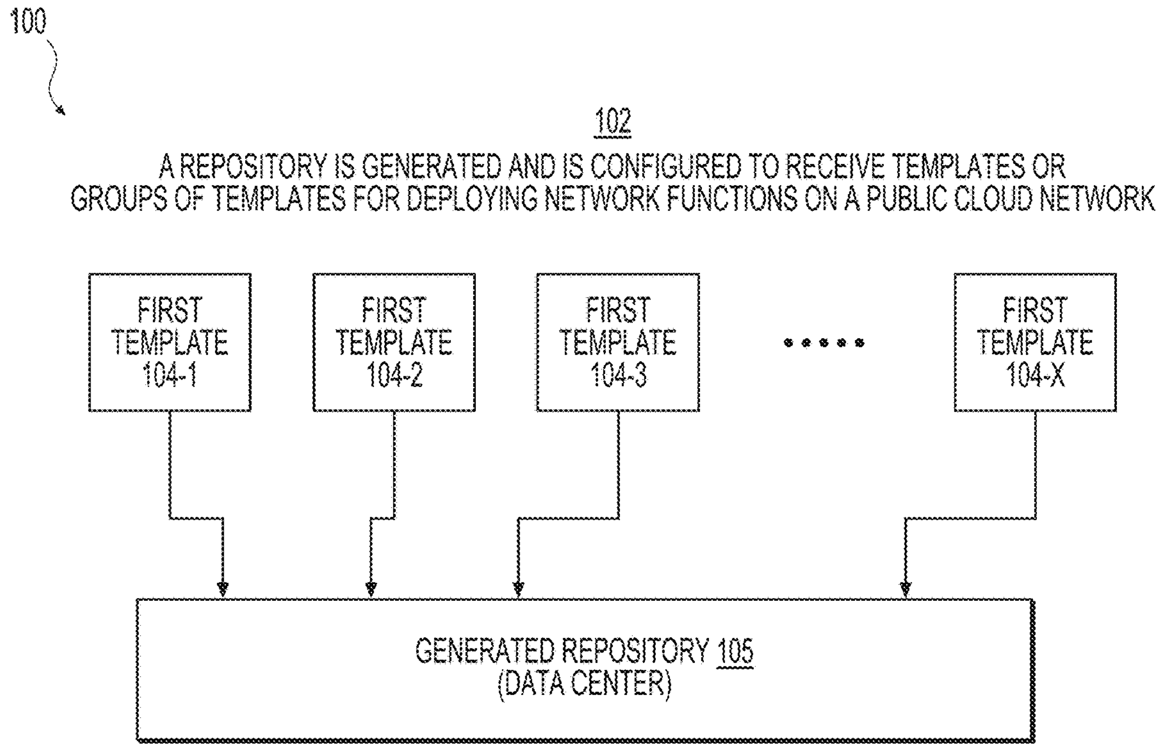
FIGS. 1A-1D illustrate an exemplary implementation of an embodiment of the present disclosure.

With the above overview in mind, the following description sets forth numerous specific details in order to provide a thorough understanding of the present invention. It will be apparent, however, to one skilled in the art that the present invention may be practiced without some or all of these specific details. Operations may be done in different orders, and in other instances, well known process operations have not been described in detail in order not to unnecessarily obscure the present invention. Several exemplary embodiments of the invention will now be described in detail with reference to the accompanying drawings.

Deployment of Cloud Network Functions

A cloud service provider may generate a cloud platform, which is an infrastructure configured to receive templates or groups of templates for deployment of containerized network functions onto different cloud services. Instead of requiring multiple platform-specific pipelines to deploy the network functions, which are defined by the templates, the generated cloud platform is designed to provide one or more cloud agnostic pipelines for connecting to any public cloud service (e.g., AWS, VMware, Azure, etc.) on which a 5G wireless network is operating. In this regard, the templates define a stack for a workload environment and tasks for provisioning cloud resources and deploying, on the cloud network, the workload environment associated with the stack, which includes applications, libraries, services, data, and/or an operating system for implementation of the containerized network functions. Different sources (e.g., customers, vendors, organizations, clients, etc.) having their own respective templates, are provided with access to the cloud platform, and may place their respective templates in a cloud platform repository hosted by a designated cloud service provider, thereby reducing the costs associated with having multiple subscriptions with multiple cloud service providers.

FIGS. 1A-1D are diagrams of an exemplary implementation 100 described herein. For example, as shown in implementation 100 of FIG. 1A, by reference number 102, infrastructural code is generated to configure a repository 105, such as one or more data centers, for receiving templates or groups of templates for deploying network functions onto a public cloud network. One or more data sources, such as customers, vendors, organization, clients, etc., may provide at least one template 104-1, 104-2, 104-3 to 104-X (referred to as a "first template" in FIG. 1A) for deploying containerized network functions, or workload environments, onto different clouds or cloud platforms hosted on the public cloud network. Examples of containerized network functions for deployment include data streaming, voice, and messaging services. The first template data obtained from the organizations, or other sources of the deployment-bound network functions, are provided to the cloud service provider via the respective first templates 104-1, 104-2, 104-3 to 104-X, each template containing a set of instructions for creating a container that can run on a cloud platform. An example of such template is a Docker® image generated by a Docker® open-source software platform, which is used to create, deploy, and manage virtualized application containers on a common operating system (OS). In exemplary embodiments, a template (or a file), such as a Docker® image, is used to run code within the container, and the template contains instructions needed to run the code. The organizations, or other sources of the network function information, use the generated templates to provide deployment-bound network functions to the cloud service provider, and these templates are stored in the repository 105 of the cloud platform that is hosted by the cloud service provider.

Figure 1B:
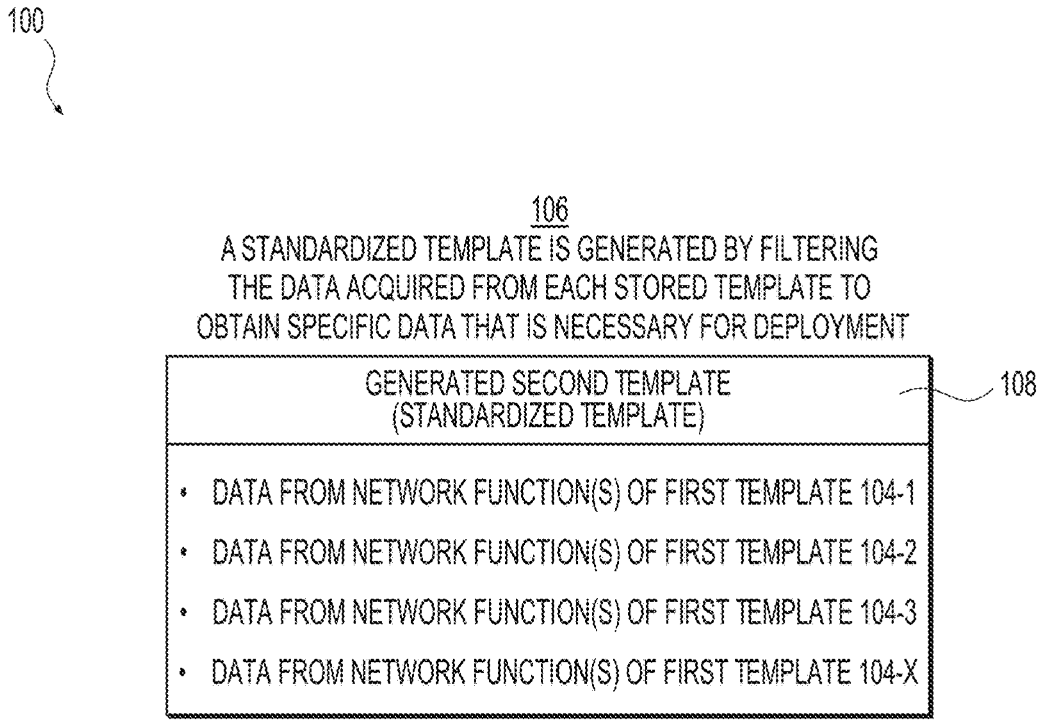

As shown in implementation 100 of FIG. 1B, by reference number 106, a provider, such as a cloud service provider, may generate a standardized template for deployment of the network functions. The standardized template, which is identified as a second template 108 in FIG. 1B, is generated by acquiring, from each of the first templates 104-1, 104-2, 104-3 to 104-X, the minimum data needed for deployment of the network functions, by filtering the first template data obtained from the one or more organizations.

Figure 1C:
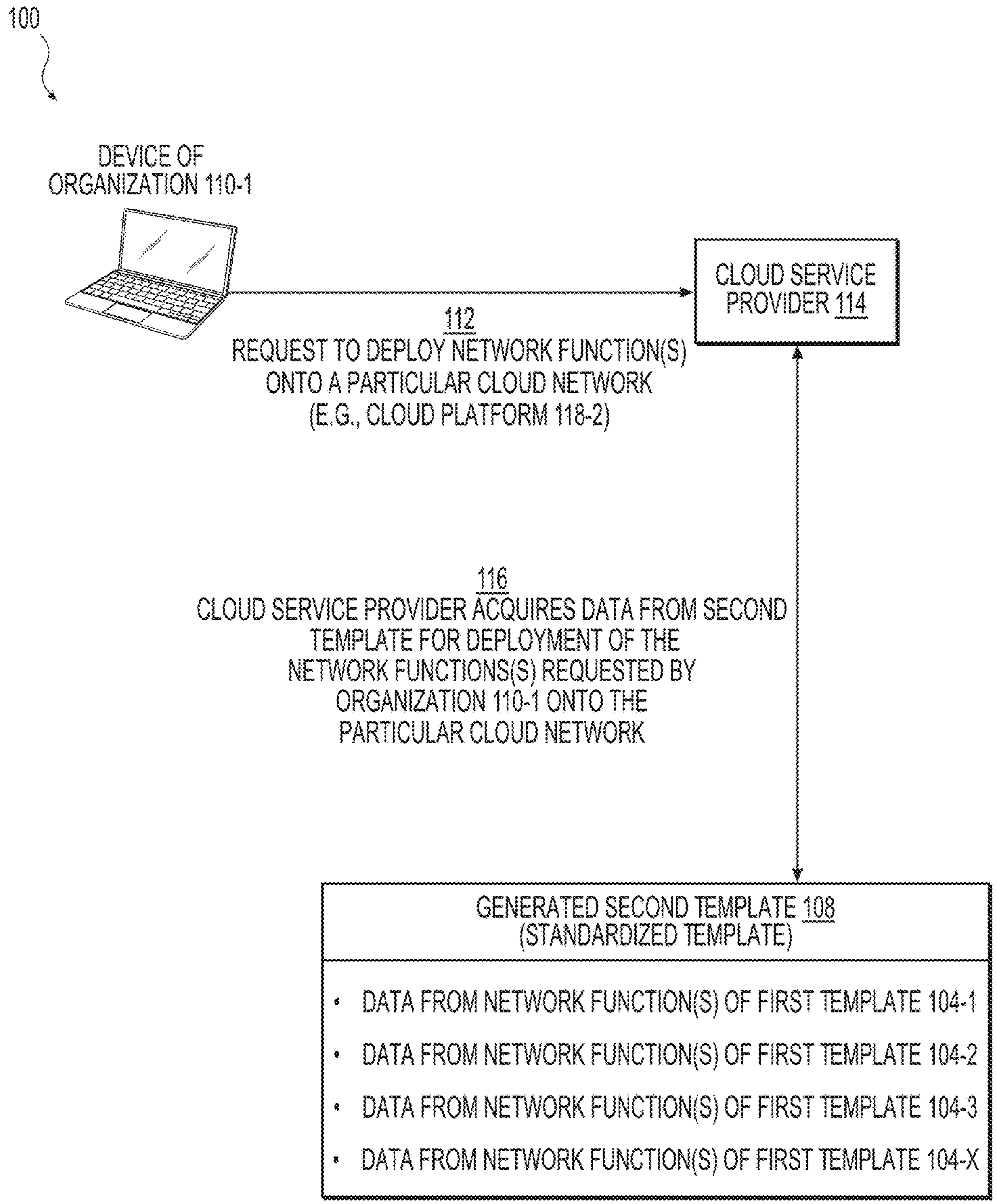
Figure 1D:
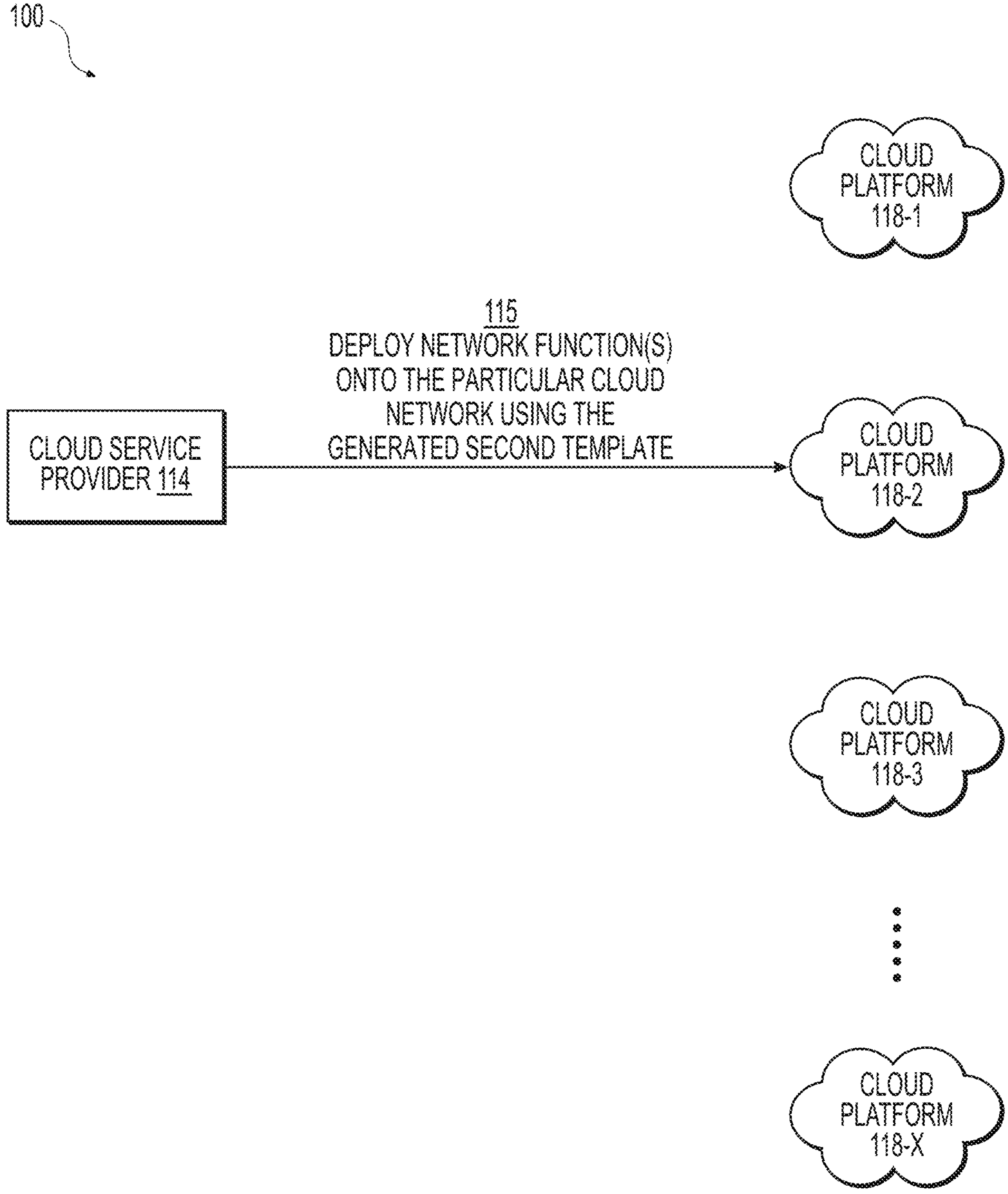

As shown in implementation 100 of FIG. 1C, by reference number 112, an organization 110-1, which provides a first template 104-1, may submit a request to a cloud service provider 114 to deploy one or more network functions onto a particular cloud network, such as cloud platform 118-2 (shown in FIG. 1D). Upon receipt of the request, as shown by reference number 116 of FIG. 1C, the cloud service provider 114 acquires relevant data from the second template 108, which is a standardized template for deployment of the one or more network functions onto the particular cloud network requested by the organization 110-1.

With reference to FIG. 1D, as shown by reference number 115, the cloud service provider 114 deploys the one or more network functions onto the particular cloud network using the generated second template 108. For example, in accordance with a request from organization 110-1, the cloud service provider 114 deploys the one or more network functions onto cloud platform 118-2.

Figure 2A:
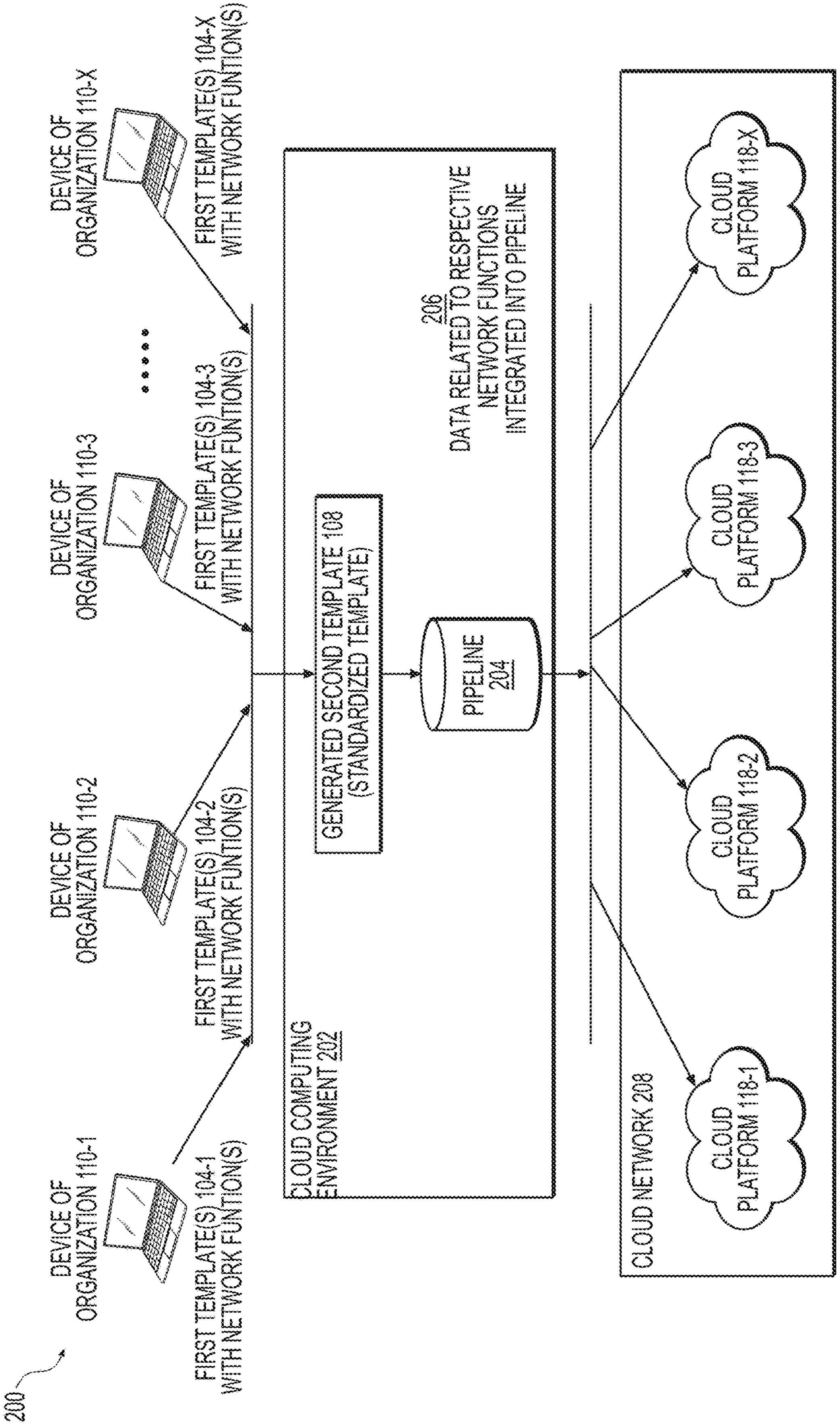
FIGS. 2A-2B illustrate an exemplary environment in which systems and/or methods described herein, may be implemented.
Figure 2B:
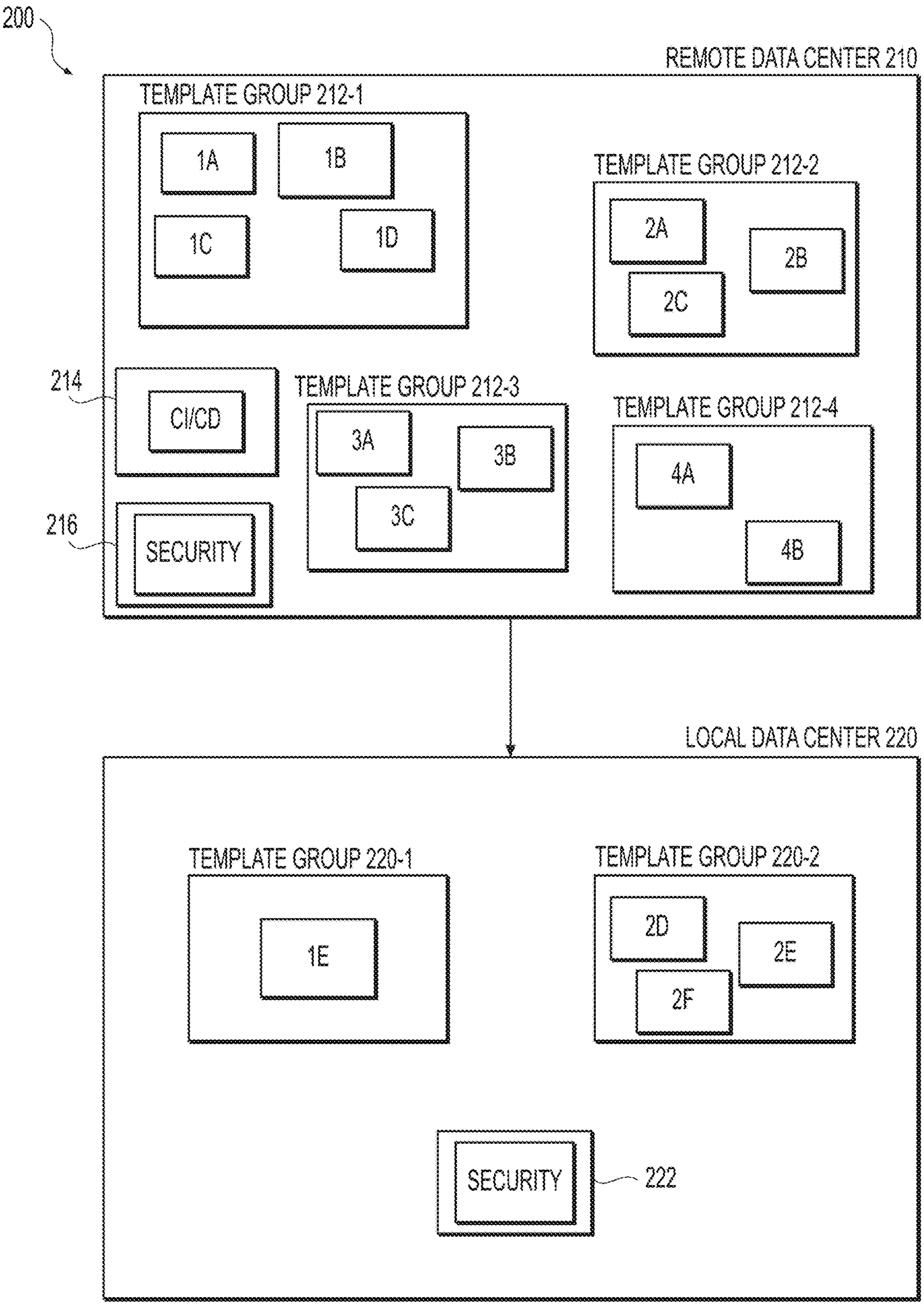

FIGS. 2A-2B illustrate an exemplary environment 200 in which systems and/or methods described herein, may be implemented. As shown in FIG. 2A, the exemplary environment 200 may include a network of nodes associated with a group of organizations 110-1, 110-2, 110-3 to 110-X. Each organization provides its own one or more first templates 104-1, 104-2, 104-3 to 104-X, respectively, where the templates contain different information for implementing the respective network functions on one or more cloud platforms. In cloud computing environment 202, the second template 108 is generated using filtered information acquired from the first templates 104-1, 104-2, 104-3 to 104-X, which contain information relating to the network functions being requested for deployment. The second template 108 is a standardized template that is provisioned for implementation of the network functions in the cloud-based infrastructure.

As shown by reference number 206, data relating to the respective network functions is integrated into a pipeline 204, in which raw data is acquired from various data sources, such as organizations 110-1, 110-2, 110-3 to 110-X, and then ported to a data store, such as a data lake or data warehouse, for analysis. Before data flows into a data repository, it usually undergoes some data processing. This is inclusive of data transformations, such as filtering, masking, and aggregations, which ensure appropriate data integration and standardization. Thus, in the example environment 200, the network function information necessary for deployment, which is acquired from the templates 104-1, 104-2, 104-3 to 104-X, and which is standardized to generate the second template 108, may be automatically integrated into the pipeline 204. In this way, instead of multiple platform-specific pipelines for connecting to any public cloud service, such as the cloud platforms 118-1, 118-2,

118-3 to 118-X, on which the cloud network 208 is operating, a single pipeline 204 may be generated, thereby increasing the efficiency of the network. Additionally, efficiency of the deployment operation itself is increased by avoiding the need to create code for each of multiple cloud platforms. In this way, a cloud agnostic pipeline 204 is established, such that the network functions may be deployed regardless of the cloud platform that is targeted for use.

For example, in a case where thirty different pipelines may have been required to accommodate each individual request for deployment onto different cloud platforms (e.g., AWS, VMware, Azure, etc.), the data relating to all of the respective network functions may be integrated into a single pipeline 204 for deployment. By way of further example, the pipeline 204 is not limited to a single pipeline, and instead may include multiple pipelines, but still fewer pipelines than would be necessary for a one-to-one correspondence between each first template 104-1, 104-2, 104-3 to 104-X and a respective pipeline for deployment onto various different cloud platforms hosted by different sources.

To implement applications in the cloud network, the cloud platform or infrastructure (i.e., code) may be hosted in a single location or in multiple locations, depending on network requirements. Each such location is a region having a separate geographical area and multiple isolated locations that may include availability zones, or "remote data centers," and local zones, or "local data centers." Remote data centers and local data centers may be configured as repositories for storing templates and other resources, where the local data centers provide the ability to place resources in multiple locations closer to end users.

As shown in FIG. 2B, the exemplary environment 200 includes a remote data center 210 and a local data center 220, which are configured to store various computing resources, such as a continuous integration and continuous delivery or deployment (CI/CD) module 214, and security modules 216 and 222. The remote data center 210 and the local data center 220 are also configured to store the respective templates received from data sources, such as customers, vendors, organizations, clients, etc. For example, each data source may provide a template group, such as template groups 212-1, 212-2, 212-3, 212-4 for storage in the remote data center 210, and template groups 220-1, 220-2 for storage in the local data center 220. Each template group in the exemplary remote data center 210 may include one or more templates, for example, templates 1A, 1B, 1C, 1D in template group 212-1, templates 2A, 2B, 2C in template group 212-2, templates 3A, 3B, 3C in template group 212-3, and templates 4A, 4B in template group 212-4. By way of further example, each template group in the exemplary local data center 220 may include one or more templates, for example, template 1E in template group 220-1, and templates 2D, 2E, 2F in template group 220-2. Although the exemplary environment 200 in FIG. 2B shows templates stored on the local data center 220, in some embodiments, templates may or may not be stored on the local data center 220, and more, or all, of the template groups may be provided within the remote data center 210.

Figure 3:
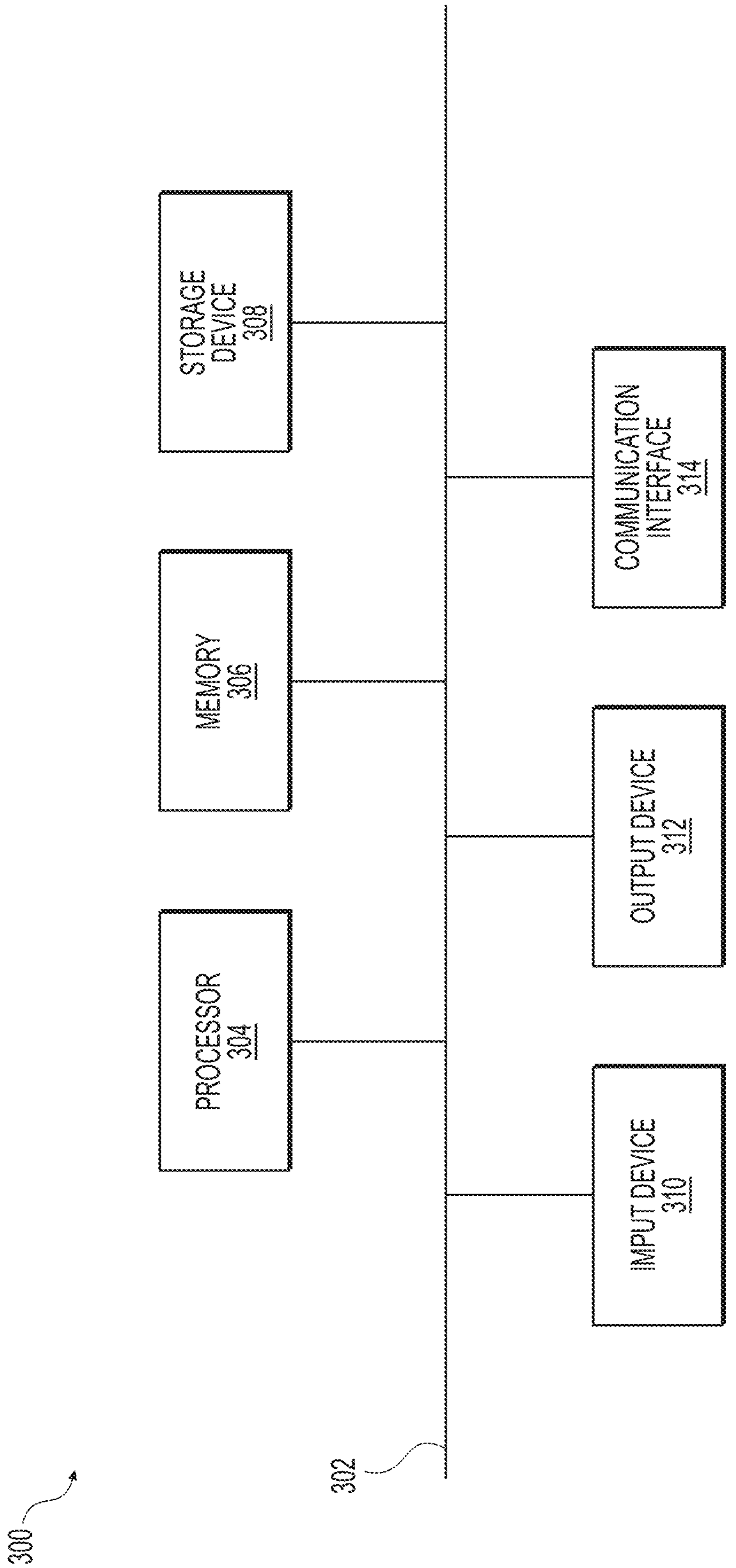
FIG. 3 illustrates exemplary components of a computing environment in which the systems and/or methods described herein may be implemented.

FIG. 3 illustrates example components of a computing environment in which the systems and/or methods described herein may be implemented. As shown, a device 300 may correspond to node or computing device associated with a data source, such as organizations 110-1, 110-2, 110-3 to 110-X. The device 300 may also correspond to a device in a cloud computing environment 202 of a cloud service provider 114, for example.

As illustrated in FIG. 3, the exemplary device 300 includes a bus 302, a processor 304, a memory 306, a storage device 308, an input device 310, an output device 312, and a communication interface 314. The bus 302 is a system connection that permits communication among the components of the device 300, and couples the various components of the device 300 to the processor 304. The processor 304 is a central processing unit (CPU), a graphics processing unit (GPU), an accelerated processing unit (APU), a microprocessor, a microcontroller, a digital signal processor (DSP), a field-programmable gate array (FGPA), an application-specific integration circuit (ASIC), or another type of processing component. In some implementations, the processor 304 includes one or more processors capable of being programmed to perform a function.

The memory 306 includes a read-only memory (ROM), a random-access memory (RAM), and/or another type of dynamic or static storage device (e.g., a flash memory, a magnetic memory, an optical memory, etc.) that stores information and/or instructions for use by the processor 304. These and other components can be configured to control the processor 304 to perform various actions. Other system memory may also be available, such as storage device 308, which may store information and/or software related to the operation and use of the device. For example, the storage component 308 may include a hard disk (e.g., a magnetic disk, an optical disk, a magneto-optic disk, a solid state disk, etc.), a compact disk (CD), a digital versatile disk (DVD), a floppy disk, a cartridge, magnetic tape, and/or another type of non-transitory computer-readable medium, along with a corresponding drive.

Input device 310 may include a mechanism that permits an operator to input information to device 300, such as a keyboard, a mouse, a pen, voice recognition and/or biometric mechanisms, etc. Output device 312 may include a mechanism that outputs information to the operator, including a display, a printer, a speaker, etc. Communication interface 314 may include any transceiver-like mechanism that enable device 300 to communicate with other devices and/or systems. For example, communication interface 314 may include mechanisms for communicating with another device or system via a network, such as the network formed between the devices of the organizations 110-1, 110-2, 110-3 to 110-X and the cloud computing environment 202.

Figure 4A:
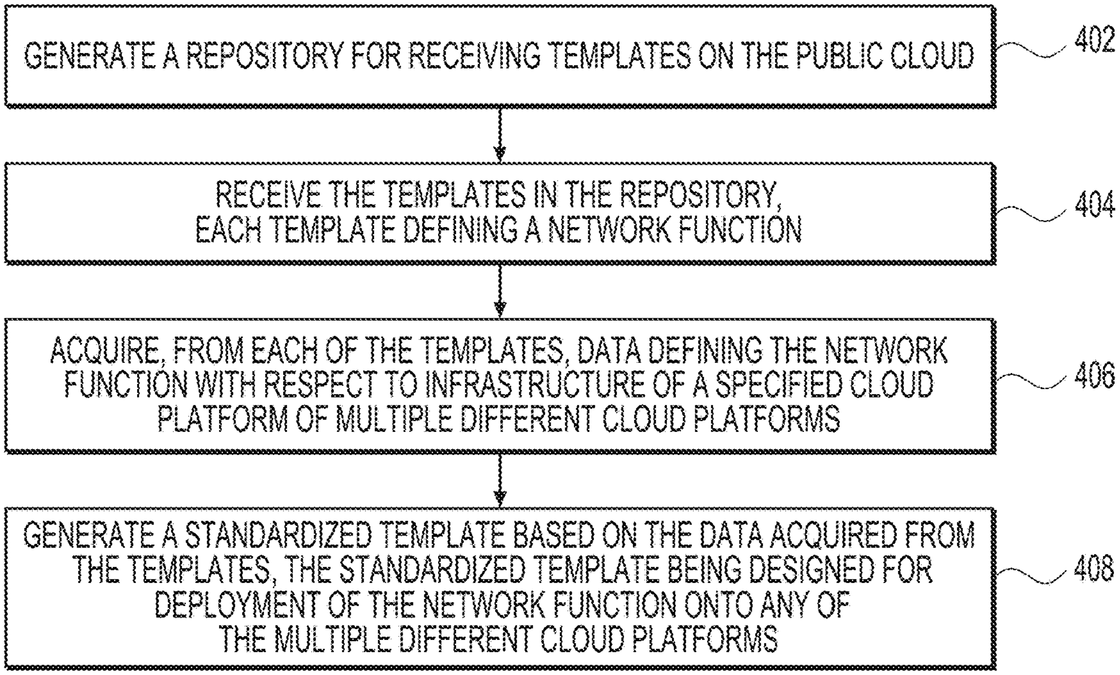
FIGS. 4A-4B are flowcharts illustrating a method for deploying network functions on a public cloud of a cellular network according to an exemplary embodiment of the present disclosure.

FIG. 4A is a flowchart illustrating a method implemented on a public cloud of a cellular network according to exemplary embodiments of the present disclosure. In this regard, in block 402 of FIG. 4A, processor 304 generates a repository for receiving templates for deploying the network functions onto different cloud platforms within the public cloud. The templates contain data that defines the network functions with respect to infrastructure of each of multiple different cloud platforms.

In block 404, the processor 304 receives, from a source (e.g., customers, vendors, organizations, clients, etc.), one or more templates for storage in the repository, where each template contains data defining one or more network functions. In block 406, the processor 304 acquires, from each of the templates received from the source, the data that defines the one or more network functions with respect to the infrastructure of the cloud platform. After acquiring the data from each template, in block 408, the processor 304 generates a standardized template based on the data acquired from the templates, the standardized template being designed, by the processor 304, for deployment of the network function onto any of the multiple different cloud platforms. For example, the processor 304 may design the standardized template containing the data that defines the one or more network functions for deployment on a first public cloud platform, and the processor 304 may further design the standardized template for deployment of the one or more network functions onto a second public cloud platform, which is different from the first public cloud platform. That is, the target cloud platform may be one of multiple different cloud platforms, and each cloud platform may have a different infrastructure from each other.

Figure 4B:
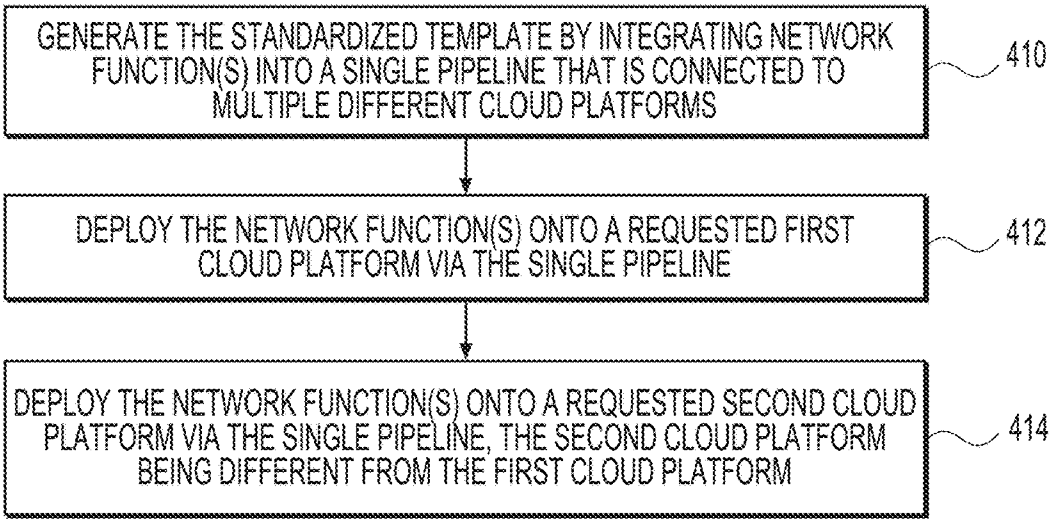

FIG. 4B is a flowchart further illustrating a method implemented on a public cloud of a cellular network according to exemplary embodiments of the present disclosure. As shown in block 410, the processor 304 may generate the standardized template by integrating the received network functions into a single pipeline that is connected to multiple different cloud platforms. In block 410, the processor 304 may further deploy a network function onto a first cloud platform via the single pipeline, and as shown in block 412, the processor 304 may deploy the same or a different network function onto a second cloud platform having a different infrastructure from that of the first cloud platform. As such, the standardized template is designed for deploying all network functions, in accordance with a request from multiple sources, onto the public cloud (e.g., AWS, VMware, Azure, etc.) of a network such as a 5G wireless network. In this way, the standardized template accommodates deployment of the network functions onto different cloud platforms, without the need for individually deploying each network function from each source onto the different cloud platforms. Thus, such generated standardized template greatly increases the efficiency of the network.

Figure 5:
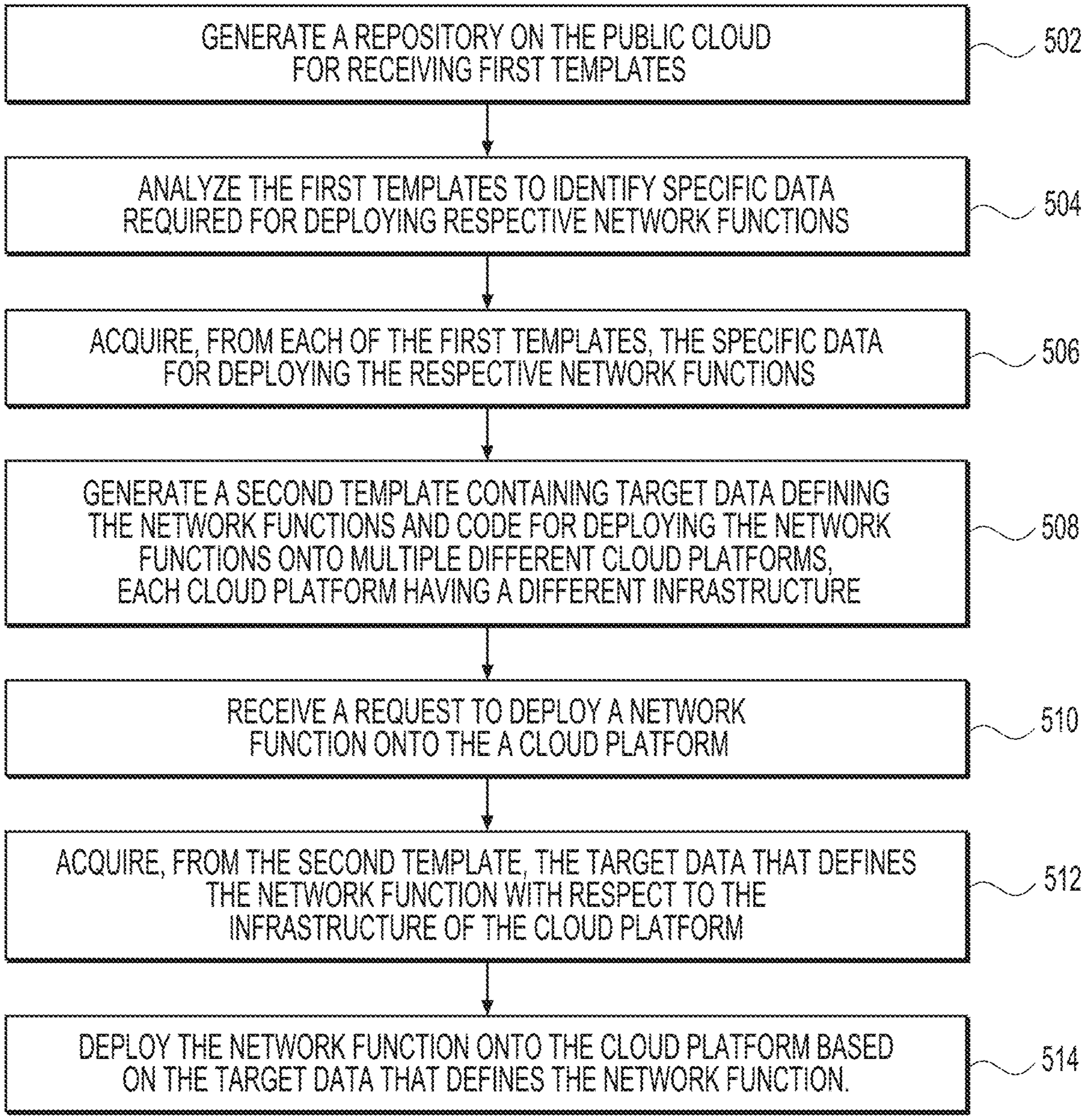
FIG. 5 is a flowchart illustrating a method for deploying network functions on a public cloud of a cellular network according to another exemplary embodiment of the present disclosure.

FIG. 5 is a flowchart illustrating a method for deploying network functions on a public cloud of a cellular network according to another exemplary embodiment of the present disclosure. As shown in block 502 of FIG. 5, processor 304 generates a repository on the public cloud for receiving one or more first templates, where the first templates may be obtained from a source (e.g., customers, vendors, organizations, clients, etc.) requesting deployment of the network functions. In block 504, the processor 304 analyzes the first templates to identify specific data required for deploying respective network functions onto a cloud platform. As shown in block 506, the processor 304 acquires, from the first templates, the specific data that is required for deploying the respective network functions. Upon acquiring the specific data from the first templates, in block 508, the processor 304 generates a second template containing target data that defines the at least one network function with respect to the infrastructure of the cloud platform and code for deploying the network functions onto multiple different cloud platforms, where each cloud platform may have a different infrastructure. In block 510, the processor 304 may receive a request from the source to deploy a particular network function onto a specified cloud platform. As shown in block 512, the processor 304 acquires, from the second template, the target data that defines the network function with respect to the infrastructure of the specified cloud platform. Upon acquiring the specific data for deploying the network functions onto one or more different cloud platforms within the public cloud, the second template is generated by an application running on the RAN node of the cellular network and contains the specific data that defines the network functions with respect to infrastructure of each of the respective cloud platforms.

In block 508, the processor 304 receives a request to deploy at least one network function of the network functions onto a cloud platform of the different cloud platforms, and in block 510, the processor 304 acquires, from the second template, the target data that defines the network functions with respect to the infrastructure of the cloud platform. In block 512, in accordance with the request, deploys the network functions onto the cloud platform based on the target data that defines the respective network functions.

Establishing a Cellular Network Using Containerized Applications

The containerized application can be any containerized application but is described herein as Kubernetes clusters for ease of illustration, but it should be understood that the present invention should not be limited to Kubernetes clusters and any containerized applications could instead be employed. In other words, the below description uses Kubernetes clusters and exemplary embodiments but the present invention should not be limited to Kubernetes clusters.

The network function deployment described with reference to FIGS. 1A-5 can be implemented within a cellular network using Kubernetes clusters. As such, various embodiments provide running Kubernetes clusters along with a radio access network (RAN) to coordinate workloads in the cellular network, such as a 5G cellular network. Broadly speaking, embodiments of the present invention provide methods, apparatuses and computer implemented systems for providing data for observability on a 5G cellular network using servers at cell sites, cell towers and Kubernetes clusters that stretch from a public network to a private network.

A Kubernetes cluster may be part of a set of nodes that run containerized applications. Containerizing applications is an operating system-level virtualization method used to deploy and run distributed applications without launching an entire virtual machine (VM) for each application.

Cluster configuration software is available at a cluster configuration server. This guides a user, such as a system administrator, through a series of software modules for configuring hosts of a cluster by defining features and matching hosts with requirements of features so as to enable usage of the features in the cluster. The software automatically mines available hosts, matches host with features requirements, and selects the hosts based on host-feature compatibility. The selected hosts are configured with appropriate cluster settings defined in a configuration template to be part of the cluster. The resulting cluster configuration provides an optimal cluster of hosts that are all compatible with one another and allows usage of various features. Additional benefits can be realized based on the following detailed description.

The present application uses such containerized applications (e.g., Kubernetes clusters) to deploy a RAN so that the vDU of the RAN is located at one Kubernetes cluster and the vCU is located at a remote location from the vDU. This configuration allows for a more stable and flexible configuration for the RAN.

Figure 6:
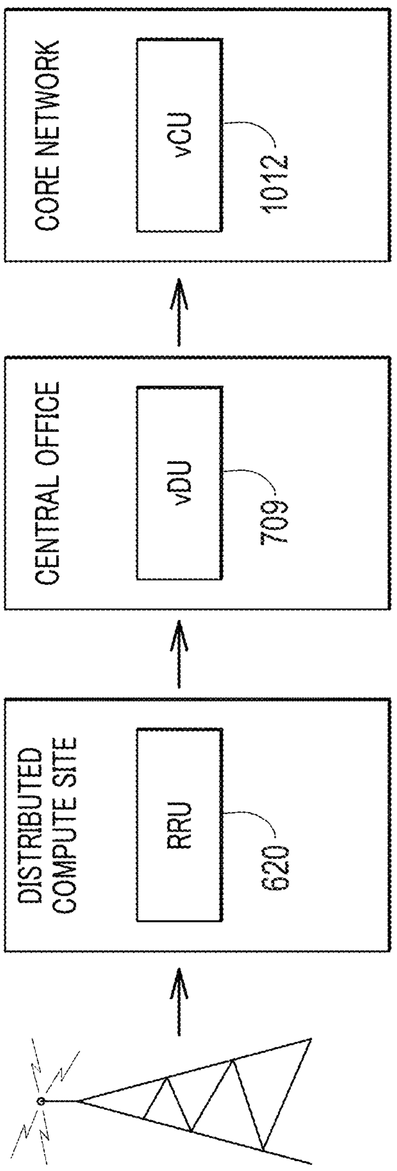
FIG. 6 illustrates a high level block diagram showing a 5G cellular network using vDUs and a vCU.

As shown in FIG. 6, the RAN includes a tower 707, RU (or remote radio unit (RRU)) 620, DU (or virtualized distributed unit vDU, as shown) 709, CU (or virtualized central unit vCU, as shown) 1012, and an element management system (EMS) (not shown). FIG. 6 illustrates a system that delivers full RAN functionality using network functions virtualization (NFV) infrastructure. This approach decouples baseband functions from the underlying hardware and creates a software fabric. Within the solution architecture, virtualized baseband units (vBBU) process and dynamically allocate resources to remote radio units (RRUs)

based on the current network needs. Baseband functions are split between central units (CUs) and distributed units (DUs) that can be deployed in aggregation centers or in central offices using a distributed architecture, such as using Kubernetes clusters as discussed herein.

Virtualized CUs and DUs (vCUs and vDUs) run as virtual network functions (VNFs) within the NFV infrastructure. The entire software stack that is needed is provided for NFV, including open source software. This software stack and distributed architecture increases interoperability, reliability, performance, manageability, and security across the NFV environment.

RAN standards require deterministic, low-latency, and low-jitter signal processing. These may be achieved using containerized applications (e.g., Kubernetes clusters) to control each RAN. Moreover, the RAN may support different network topologies, allowing the system to choose the location and connectivity of all network components. Thus, the system allowing various DUs on containerized applications (e.g. Kubernetes clusters) allows the network to pool resources across multiple cell sites, scale capacity based on conditions, and ease support and maintenance requirements.

Figure 7:
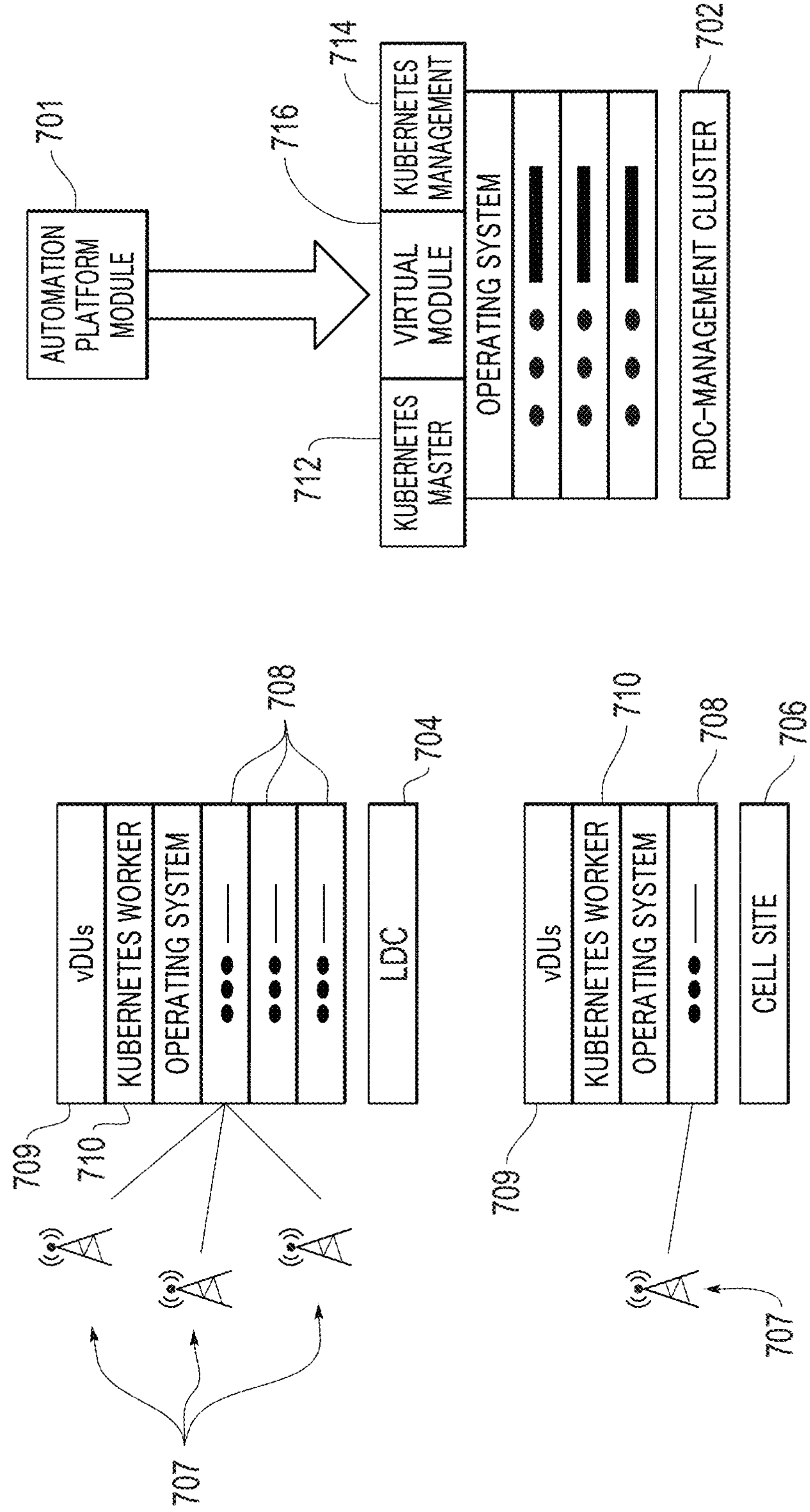
FIG. 7 illustrates a high level block diagram showing a 5G cellular network with clusters.

FIG. 7 illustrates an exemplary system used in constructing clusters that allows a network to control cell sites, in one embodiment of the invention. The system includes a cluster configuration server that can be used by a cell site to provide various containers for processing of various functions. Each of the cell sites are accessed via at least one cellular tower (and RRU) by the client devices, which may be any computing device which has cellular capabilities, such as a mobile phone, computer or other computing device.

As shown, the system includes an automation platform (AP) module 701, a remote data center (RDC) 702, one or more local data centers (LDC) 704, and one or more cell sites 706.

The cell sites provide cellular service to the client devices through the use of a vDU 709, server 708, and a cell tower 707. The server 708 at a cell site 706 controls the vDU 709 located at the cell site 706, which in turn controls communications from the cell tower 707. Each vDU 709 is software to control the communications with the cell towers 707, RRUs, and CU so that communications from client devices can communicate from one cell tower 707 through the clusters (e.g. Kubernetes clusters) to another cell tower 707. In other words, the voice and data from a cellular mobile client device connects to the towers and then goes through the vDU to transmit such voice and data to another vDU to output such voice and data to another tower 707.

The server(s) on each individual cell site 706 or LDC 704 may not have enough computing power to run a control plane that supports the functions in the mobile telecommunications system to establish and maintain the user plane. As such, the control plane is then run in a location that is remote from the cell sites 706, such as the RDC.

The RDC 702 is the management cluster which manages the LDC 704 and a plurality of cell sites 706. As mentioned above, the control plane may be deployed in the RDC 702. The control plane maintains the logic and workloads in the cell sites from the RDC 702 while each of the containerized applications (e.g., Kubernetes containers) is deployed at the cell sites 706. The control plane also monitors the workloads to ensure they are running properly and efficiently in the cell sites 706 and fixes any workload failures. If the control plane determines that a workload fails at the cell site 706, for example, the control plane redeploys the workload on the cell site 706.

The RDC 702 may include a master 712 (e.g., a Kubernetes master or Kubernetes master module), a management module 714 and a virtual (or virtualization) module 716. The master module 712 monitors and controls the workers 710 (also referred to herein as Kubernetes workers, though workers of any containerized applications are within the scope of this feature) and the applications running thereon, such as the vDUs 709. If a vDU 709 fails, the master module 712 recognizes this, and will redeploy the vDU 709 automatically. In this regard, the Kubernetes clusters system has intelligence to maintain the configuration, architecture and stability of the applications running. As such, the Kubernetes clusters system may be considered to be “self-healing”.

The management module 714 along with the Automation Platform 701 creates the Kubernetes clusters in the LDCs 704 and cell sites 706.

For each of the servers 708 in the LDC 704 and the cell sites 706, an operating system is loaded in order to run the workers 710. For example, such software could be ESKi and Photon OS. The vDUs are also software, as mentioned above, that runs on the workers 710. In this regard, the software layers are the operating system, and then the workers 710, and then the vDUs 709.

The automation platform module 701 includes a graphical user interface (GUI) that allows a user to initiate clusters. The automation platform module 701 communicates with the management module 714 so that the management module 714 creates the clusters and a master module 712 for each cluster.

Prior to creating each of the clusters, the virtualization module 716 creates a virtual machine (VM) so that the clusters can be created. VMs and containers are integral parts of the containerized applications (e.g., Kubernetes clusters) infrastructure of data centers and cell sites. VMs are emulations of particular computer systems that operate based on the functions and computer architecture of real or hypothetical computers. A VM is equipped with a full server hardware stack that has been virtualized. Thus, a VM includes virtualized network adapters, virtualized storage, a virtualized central processing unit (CPU), and a virtualized BIOS. Since VMs include a full hardware stack, each VM requires a complete operating system (OS) to function, and VM instantiation thus requires booting a full OS.

In addition to VMs, which provide abstraction at the physical hardware level (e.g., by virtualizing the entire server hardware stack), containers are created on top of the VMs. Containers Application presentation systems create a segmented user space for each instance of an application. Applications may be used, for example, to deploy an office suite to dozens or thousands of remote workers. In doing so, these applications create sandboxed user spaces on a server for each connected user. While each user shares the same operating system instance including kernel, network connection, and base file system, each instance of the office suite has a separate user space.

In any event, once the VMs and containers are created, the master modules 712 then create a vDU 709 for each VM.

The LDC 704 is a data center that can support multiple servers and multiple towers for cellular communications. The LDC 704 is similar to the cell sites 706 except that each LDC has multiple servers 708 and multiple towers 707. Each server in the LDC 704 (as compared with the server in each cell site 706) may support multiple towers. The server 708 in the LDC may be different from the server 708 in the cell site 706 because the servers 708 in the LDC are larger in memory and processing power (number of cores, etc.) relative to the servers in the individual cell sites 706. In this regard, each server 708 in the LDC may run multiple vDUs (e.g., 2), where each of these vDUs independently operates a cell tower 707. Thus, multiple towers 707 can be operated through the LDCs 704 using multiple vDUs using the clusters. The LDCs 704 may be placed in bigger metropolitan areas whereas individual cell sites 706 may be placed at smaller population areas.

Figure 8:
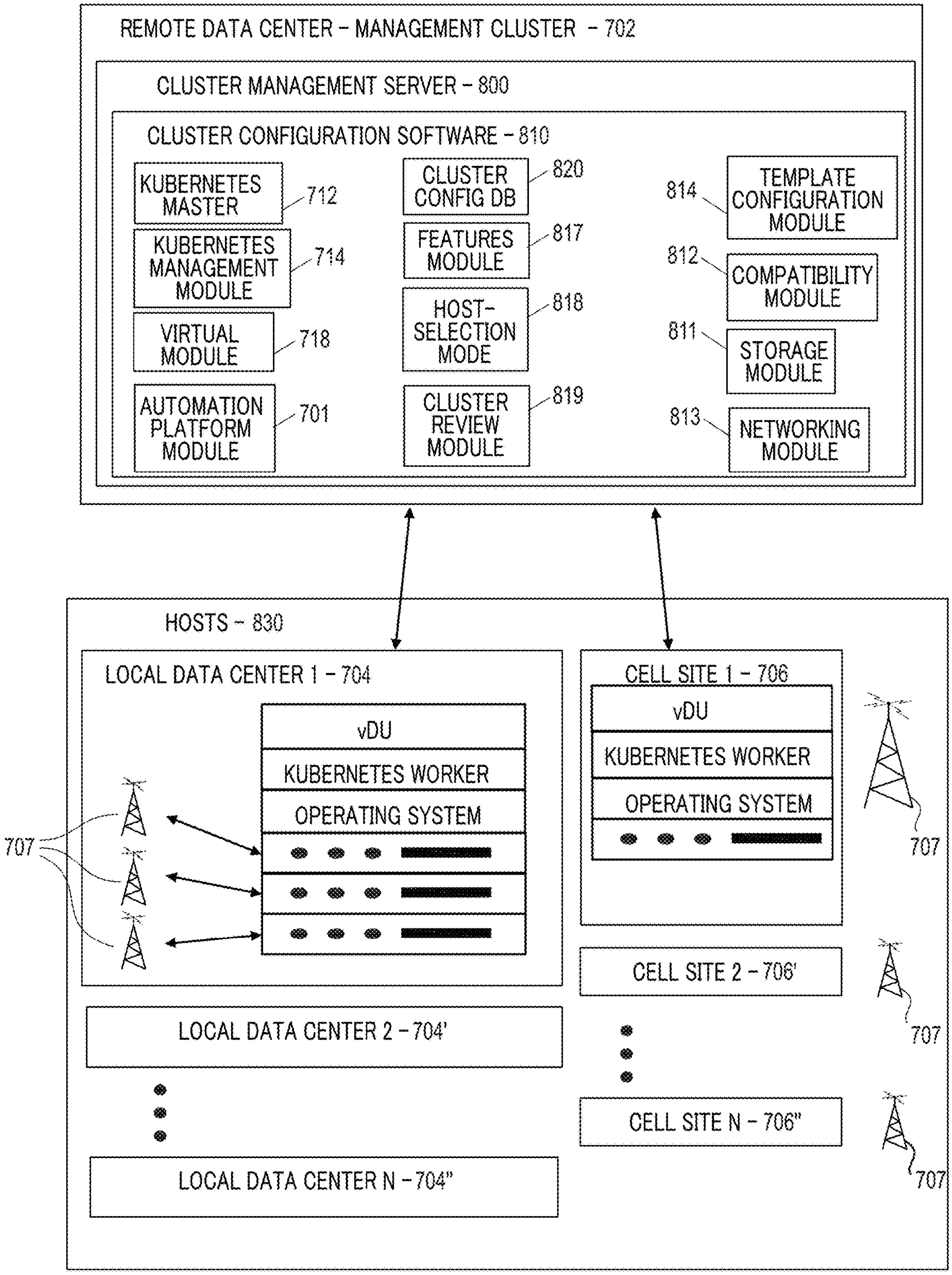
FIG. 8 illustrates a block diagram of the system of FIG. 2A but further illustrating details of cluster configuration software, according to various embodiments.

FIG. 8 illustrates a block diagram of the system of FIG. 7, while further illustrating details of cluster configuration software, according to various embodiments.

As illustrated, a cluster management server 800 is configured to run the cluster configuration software 810. The cluster configuration software 810 runs using computing resources of the cluster management server 800. The cluster management server 800 is configured to access a cluster configuration database 820. In one embodiment, the cluster configuration database 820 includes a host list with data related to a plurality of hosts 830 including information associated with hosts, such as host capabilities. For instance, the host data may include list of hosts 830 accessed and managed by the cluster management server 800, and for each host 830, a list of resources defining the respective host's capabilities. Alternately, the host data may include a list of every host in the entire virtual environment and the corresponding resources or may include only the hosts that are currently part of an existing cluster and the corresponding resources. In an alternate embodiment, the host list is maintained on a server that manages the entire virtual environment and is made available to the cluster management server 800.

In addition to the data related to hosts 830, the cluster configuration database 820 includes features list with data related to one or more features including a list of features and information associated with each of the features. The information related to the features include license information corresponding to each feature for which rights have been obtained for the hosts, and a list of requirements associated with each feature. The list of features may include, for example and without limitations, live migration, high availability, fault tolerance, distributed resource scheduling, etc. The list of requirements associated with each feature may include, for example, host name, networking and storage requirements. Information associated with features and hosts are obtained during installation procedure of respective components prior to receiving a request for forming a cluster.

Each host is associated with a local storage and is configured to support the corresponding containers running on the host. Thus, the host data may also include details of containers that are configured to be accessed and managed by each of the hosts 830. The cluster management server 800 is also configured to access one or more shared storage and one or more shared network.

The cluster configuration software 810 includes one or more modules to identify hosts and features and manage host-feature compatibility during cluster configuration. The configuration software 810 includes a compatibility module 812 that retrieves a host list and a features list from the configuration database 820 when a request for cluster construction is received from the client. The compatibility module 812 checks for host-feature compatibility by executing a compatibility analysis which matches the feature requirements in the features list with the hosts capabilities from the host list and determines if sufficient compatibility exists for the hosts in the host list with the advanced features in the features list to enable a cluster to be configured that can utilize the advanced features. Some of the compatibilities that may be matched include hardware, software and licenses.

It should be noted that the aforementioned list of compatibilities are exemplary and should not be construed to be limiting. For instance, for a particular advanced feature, such as fault tolerance, the compatibility module checks whether the hosts provide a compatible processor family, host operating system, Hardware Virtualization enabled in the BIOS, and so forth, and whether appropriate licenses have been obtained for operation of the same. Additionally, the compatibility module 812 checks to determine if networking and storage requirements for each host in the cluster configuration database 820 are compatible for the selected features or whether the networking and storage requirements may be configured to make them compatible for the selected features. In one embodiment, the compatibility module checks for basic network requirements. This might entail verifying each host's connection speed and the subnet to determine if each of the hosts has the required speed connection and access to the right subnet to take advantage of the selected features. The networking and storage requirements are captured in the configuration database 820 during installation of networking and storage devices and are used for checking compatibility.

The compatibility module 812 identifies a set of hosts accessible to the cluster management server 800 that either matches the requirements of the features or provides the best match and constructs a configuration template that defines the cluster configuration settings or profile that each host needs to conform in the configuration database 820. The configuration analysis provides a ranking for each of the identified hosts for the cluster. The analysis also presents a plurality of suggested adjustments to particular hosts so as to make the particular hosts more compatible with the requirements. The compatibility module 812 selects hosts that best match the features for the cluster. The cluster management server 800 uses the configuration settings in the configuration template to configure each of the hosts for the cluster. The configured cluster allows usage of the advanced features during operation and includes hosts that are most compatible with each other and with the selected advanced features.

In addition to the compatibility module 812, the configuration software 810 may include additional modules to aid in the management of the cluster including managing configuration settings within the configuration template, addition/deletion/customization of hosts and to fine-tune an already configured host so as to allow additional advanced features to be used in the cluster. Each of the modules is configured to interact with each other to exchange information during cluster construction. For instance, a template configuration module 814 may be used to construct a configuration template to which each host in a cluster must conform based on specific feature requirements for forming the cluster. The configuration template is forwarded to the compatibility module which uses the template during configuration of the hosts for the cluster. The host configuration template defines cluster settings and includes information related to network settings, storage settings and hardware configuration profile, such as processor type, number of network interface cards (NICs), etc. The cluster settings are determined by the feature requirements and are obtained from the Features list within the configuration database 820.

A configuration display module may be used to return information associated with the cluster configuration to the client for rendering and to provide options for a user to confirm, change or customize any of the presented cluster configuration information. In one embodiment, the cluster configuration information within the configuration template may be grouped in sections. Each section can be accessed to obtain further information regarding cluster configuration contained therein.

A features module 817 may be used for mining features for cluster construction. The features module 817 is configured to provide an interface to enable addition, deletion, and/or customization of one or more features for the cluster. The changes to the features are updated to the features list in the configuration database 820. A host-selection module 818 may be used for mining hosts for cluster configuration. The host-selection module 818 is configured to provide an interface to enable addition, deletion, and/or customization of one or more hosts. The host-selection module 818 is further configured to compare all the available hosts against the feature requirements, rank the hosts based on the level of matching and return the ranked list along with suggested adjustments to a cluster review module 819 for onward transmission to the client for rendering.

The cluster review module 819 may be used to present the user with a proposed configuration returned by the host-selection module 818 for approval or modification. The configuration can be fine-tuned through modifications in appropriate modules during guided configuration set-up which are captured and updated to the host list in either the configuration database 820 or the server. The suggested adjustments may include guided tutorial for particular hosts or particular features. In one embodiment, the ranked list is used in the selection of the most suitable hosts for cluster configuration. For instance, highly ranked hosts or hosts with specific features or hosts that can support specific applications may be selected for cluster configuration. In other embodiments, the hosts are chosen without any consideration for their respective ranks. Hosts can be added or deleted from the current cluster. In one embodiment, after addition or deletion, the hosts are dynamically re-ranked to obtain a new ranked list. The cluster review module 812 provides a tool to analyze various combinations of hosts before selecting the best hosts for the cluster.

A storage module 811 enables selection of storage requirements for the cluster based on the host connectivity and provides an interface for setting up the storage requirements. Shared storage is required in order to take advantage of the advanced features. As a result, one should determine what storage is shared by all hosts in the cluster and use only those storages in the cluster in order to take advantage of the advanced features. The selection options for storage include all the shared storage available to every host in the cluster. The storage interface provides default storage settings based on the host configuration template stored in the configuration database 820 which is, in turn, based on compatibility with prior settings of hosts, networks and advanced features and enables editing of a portion of the default storage settings to take advantage of the advanced features. In one embodiment, if a required storage is available to only a selected number of hosts in the cluster, the storage module will provide necessary user alerts in a user interface with required tutorials on how to go about fixing the storage requirement for the configuration in order to take advantage of the advanced features. The storage module performs edits to the default storage settings based on suggested adjustments. Any updates to the storage settings including a list of selected storage devices available to all hosts of the cluster are stored in the configuration database 820 as primary storage for the cluster during cluster configuration.

A networking module 813 enables selection of network settings that is best suited for the features and provides an interface for setting up the network settings for the cluster. The networking module provides default network settings, including preconfigured virtual switches encompassing several networks, based on the host configuration template stored in the cluster configuration database, enables selecting/editing the default network settings to enter specific network settings that can be applied/transmitted to all hosts, and provides suggested adjustments with guided tutorials for each network options so a user can make informed decisions on the optimal network settings for the cluster to enable usage of the advanced features. The various features and options matching the cluster configuration requirements or selected during network setting configuration are stored in the configuration database and applied to the hosts so that the respective advanced features can be used in the cluster.

FIG. 8 also illustrates cell sites 706 that are configured to be clients of each cluster. Each cell site 706 includes a cell tower 707 and a connection to each DU, similar to FIG. 7. Each DU is labeled as a virtualized distributed unit (vDU) 709, similar to FIG. 7, and each vDU runs as virtual network functions (VNFs) within an open source network functions virtualization (NFV) infrastructure.

Figure 9:
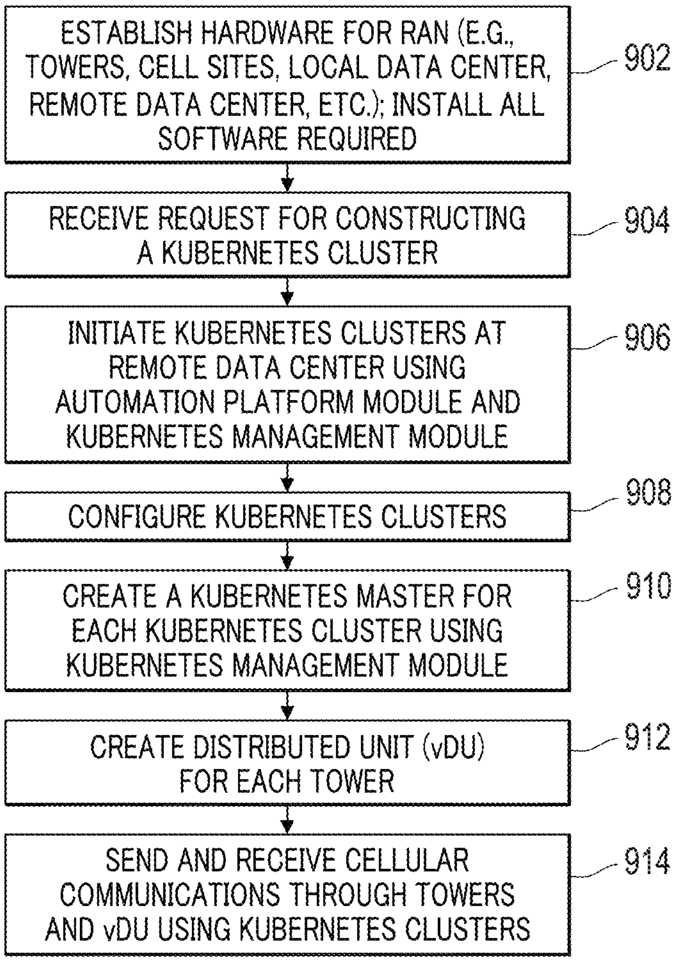
FIG. 9 illustrates a method of establishing cellular communications using clusters.

With the above overview of the various components of a system used in the cluster configuration, specific details of how each component is used in establishing and communicating through a cellular network using containerized applications such as Kubernetes clusters, as shown in FIG. 9.

First, all of the hardware required for establishing a cellular network (e.g., a RAN, which includes towers, RRUs, DUs, CU, etc.) and a cluster (e.g., servers, workers, racks, etc.) are provided, as described in block 902. The LDC 704, RDC 702, and cell sites 706 are created and networked together via a network.

In blocks 902-914, the process of constructing a cluster using a plurality of hosts will now be described.

The process begins at block 904 with a request for constructing a cluster from a plurality of hosts which support one or more containers. The request is received at the automation platform module 701 from a client. The process of receiving a request for configuring a cluster then triggers initiating the clusters at the RDC 702 using the automation platform module 701, as illustrated in block 906.

In block 908, the clusters are configured and this process will not be described.

The automation platform module 701 is started by a system administrator or by any other user interested in setting up a cluster. The automation platform module 701 then invokes the cluster configuration software on the server, such as a virtual module server, running cluster configuration software.

The invoking of the cluster configuration software triggers the cluster configuration workflow process at the cluster management server 800 by initiating a compatibility module 812. Upon receiving the request for constructing a cluster, the compatibility module 812 queries a cluster configuration database 820 available to the cluster management server 800 and retrieves a host list of hosts that are accessible and managed by the cluster management server 800 and a features list of features for forming the cluster. The host list contains all hosts managed by the cluster management server 800 and a list of capabilities of each host. The list of capabilities of each host is obtained during installation of each host. The features list contains all licensed features that have at least a minimum number of host licenses for each licensed feature, a list of requirements, such as host, networking and storage requirements. The features list includes, but is not limited to, live migration, high availability, fault tolerance, distributed resource scheduling. Information in the features list and host list are obtained from an initial installation procedure before cluster configuration and through dynamic updates based on hosts and features added, updated or deleted over time and based on number of licenses available and number of licenses in use.

The compatibility module then checks for the host-feature compatibility by executing a compatibility analysis for each of the hosts. The compatibility analysis compares the capabilities of the hosts in the host list with the features requirements in the features list. Some of the host capability data checked during host-feature compatibility analysis include host operating system and version, host hardware configuration, Basic Input/Output System (BIOS) Feature list and whether power management is enabled in the BIOS, host computer processor family (for example, Intel, AMD, and so forth), number of processors per host, number of cores available per processor, speed of execution per processor, amount of internal RAM per host, shared storage available to the host, type of shared storage, number of paths to shared storage, number of hosts sharing the shared storage, amount of shared storage per host, type of storage adapter, amount of local storage per host, number and speed of network interface devices (NICs) per host. The above list of host capability data verified during compatibility analysis is exemplary and should not be construed as limiting.

Some of the features related data checked during compatibility analysis include determining number of licenses to operate an advanced feature, such as live migration/distributed resource scheduling, number and name of hosts with one or more Gigabit (GB) Network Interface Card/Controller (NIC), list of hosts on same subnet, list of hosts that share same storage, list of hosts in the same processor family, and list of hosts compatible with Enhanced live migration (e.g., VMware Enhanced VMotion) compatibility. The above list of feature related compatibility data is exemplary and should not be construed as limiting.

Based on the host-feature compatibility analysis, the compatibility module determines if there is sufficient host-feature compatibility for hosts included on the host list with the features included on the features list to enable a cluster to be constructed that can enable the features. Thus, for instance, for a particular feature, such as fault tolerance, the compatibility module checks whether the hosts provide hardware, software and license compatibility by determining if the hosts are from a compatible processor family, the hosts operating system, BIOS features enabled, and so forth, and whether there are sufficient licenses for operation of features for each host. The compatibility module also checks to determine whether networking and storage resources in the cluster configuration database for each host is compatible with the feature requirements. Based on the compatibility analysis, the compatibility module generates a ranking of each of the hosts such that the highest ranked hosts are more compatible with the requirements for enabling the features. Using the ranking, the compatibility module assembles a proposed cluster of hosts for cluster construction. In one embodiment, the assembling of hosts for the proposed cluster construction is based on one or more pre-defined rules. The pre-defined rules can be based on the hosts capabilities, feature requirements or both the hosts capabilities and feature requirements. For example, one of the pre-defined rules could be to identify and select all hosts that are compatible with the requirements of the selected features. Another pre-defined rule could be to select a given feature and choosing the largest number of hosts determined by the number of licenses for the given feature based on the compatibility analysis. Yet another rule could be to select features and choosing all hosts whose capabilities satisfy the requirements of the selected features. Another rule could be to obtain compatibility criteria from a user and selecting all features and hosts that meet those criteria. Thus, based on the pre-defined rule, the largest number of hosts that are compatible with the features are selected for forming the cluster.

Based on the compatibility analysis, a host configuration template is constructed to include the configuration information from the proposed cluster configuration of the hosts. A list of configuration settings is defined from the host configuration template associated with the proposed cluster configuration of the hosts, as illustrated in operation 105. Each of the hosts that are compatible will have to conform to this list of cluster configuration settings. The cluster configuration settings may be created by the compatibility module or a template configuration module that is distinct from the compatibility module. The configuration settings include network settings, such as number of NICs, bandwidth for each NIC, etc., storage settings and hardware configuration profile, such as processor type, etc. Along with the configuration settings, the compatibility module presents a plurality of suggested adjustments to particular hosts to enable the particular hosts to become compatible with the requirements. The suggested adjustment may include guided tutorials providing information about the incompatible hosts, and steps to be taken for making the hosts compatible as part of customizing the cluster. The cluster configuration settings from the configuration template are returned for rendering on a user interface associated with the client.

In one embodiment, the user interface is provided as a page. The page is divided into a plurality of sections or page elements with each section providing additional details or tools for confirming or customizing the current cluster.

The configuration settings from a configuration template are then rendered at the user interface on the client in response to the request for cluster configuration. If the rendered configuration settings are acceptable, the information in the configuration template is committed into the configuration database for the cluster and used by the management server for configuring the hosts for the cluster. The selected hosts are compatible with the features and with each other. Configuration of hosts may include transmitting storage and network settings from the host configuration template to each of the hosts in the cluster, which is then applied to the hosts. The application of the configuration settings including network settings to the hosts may be done through a software module available at the hosts, in one embodiment of the invention. In one embodiment, a final report providing an overview of the hosts and the cluster configuration features may be generated and rendered at the client after applying the settings from the configuration template. The cluster configuration workflow concludes after successful cluster construction with the hosts.

The cluster creation process further includes creating master modules 712 for each of the clusters being created, as provided in block 910. This is because each master module 712 controls and monitors performance of the respective cluster. Also, in block 912, the vDUs are also installed over the workers 710. In this regard, the vDUs are installed to communicate with a tower and a respective RRU.

Once the clusters are created, communication between the clusters in the data centers occurs through the towers and vDUs using the clusters, as provided in block 914. In this regard, communication is facilitated and monitored using the master modules 712. In this regard, the clusters include containers running on the clusters and the vDUs are running in the containers. In this regard, when voice and data that is received through a tower is received through the RRU and vDU, they are then communicated through the network and then routed to a corresponding location it is addressed to.

In this regard, a 5G network can be established using containerized applications (e.g., Kubernetes clusters) which is more stable and managed more effectively than previous systems. Workloads of clusters can be managed by the master modules so that any processing that is high on one server can be distributed to other servers over the clusters. This is performed using the master module which is continuously and automatically monitoring the workloads and health of all of the vDUs.

Stretching the Containerized Applications

In some embodiments, containerized applications (e.g., Kubernetes clusters) are used in 5G to stretch a private cloud network to/from a public cloud network. Each of the workload clusters in a private network is controlled by master nodes and support functions (e.g. MTCIL) that are run in the public cloud network.

Also, a virtualization platform runs the core and software across multiple geographic availability zones. A data center within the public network 1002/cloud stretches across multiple availability zones (AZs) in a public network to host: (1) stack management and automation solutions (e.g. the automation platform module, the virtual module, etc.) and (2) cluster management module and the control plane for the RAN clusters. If one of the availability zones fails, another of the availability zones takes over, thereby reducing outages. More details are presented below of this concept.

A private network (sometimes referred to as a data center) resides on a company's own infrastructure, and is typically firewall protected and physically secured. An organization may create a private network by creating an on-premises infrastructure, which can include servers, towers, RRUs, and various software, such as DUs. Private networks are supported, managed, and eventually upgraded or replaced by the organization. Since private clouds are typically owned by the organization, there is no sharing of infrastructure, no multi-tenancy issues, and zero latency for local applications and users. To connect to the private network, a user's device must be authenticated, such as by using a pre-authentication key, authentication software, authentication handshaking, and the like.

Public networks alleviate the responsibility for management of the infrastructure since they are by definition hosted by a public network provider such as AWS, Azure, or Google Cloud. In and infrastructure-as-a-service (IaaS) public network deployment, enterprise data and application code reside on the public network provider servers. Although the physical security of hyperscale public network providers such as AWS is unmatched, there is a shared responsibility model that requires organizations that subscribe to those public network services to ensure their applications and network are secure, for example by monitoring packets for malware or providing encryption of data at rest and in motion.

Public networks are shared, on-demand infrastructure and resources delivered by a third-party provider. In a public network deployment the organization utilizes one or more types of cloud services such as software-as-a-service (SaaS), platform-as-a-service (PaaS) or IaaS from public providers such as AWS or Azure, without relying to any degree on private cloud (on-premises) infrastructure.

A private network is a dedicated, on-demand infrastructure and resources that are owned by the user organization. Users may access private network resources over a private network or VPN; external users may access the organization's IT resources via a web interface over the public network. Operating a large datacenter as a private network can deliver many benefits of a public network, especially for large organizations.

In its simplest form, a private network is a service that is completely controlled by a single organization and not shared with other organizations, while a public network is a subscription service that is also offered to any and all customers who want similar services.

Regardless, because cellular networks are private networks run by a cellular provider, and the control of the containerized applications (e.g., Kubernetes clusters) and the control plane needs to be on a public network which has more processing power and space, the containerized applications (e.g., Kubernetes clusters) need to originate on the public network and extend or "stretch" to the private network.

Figure 10:
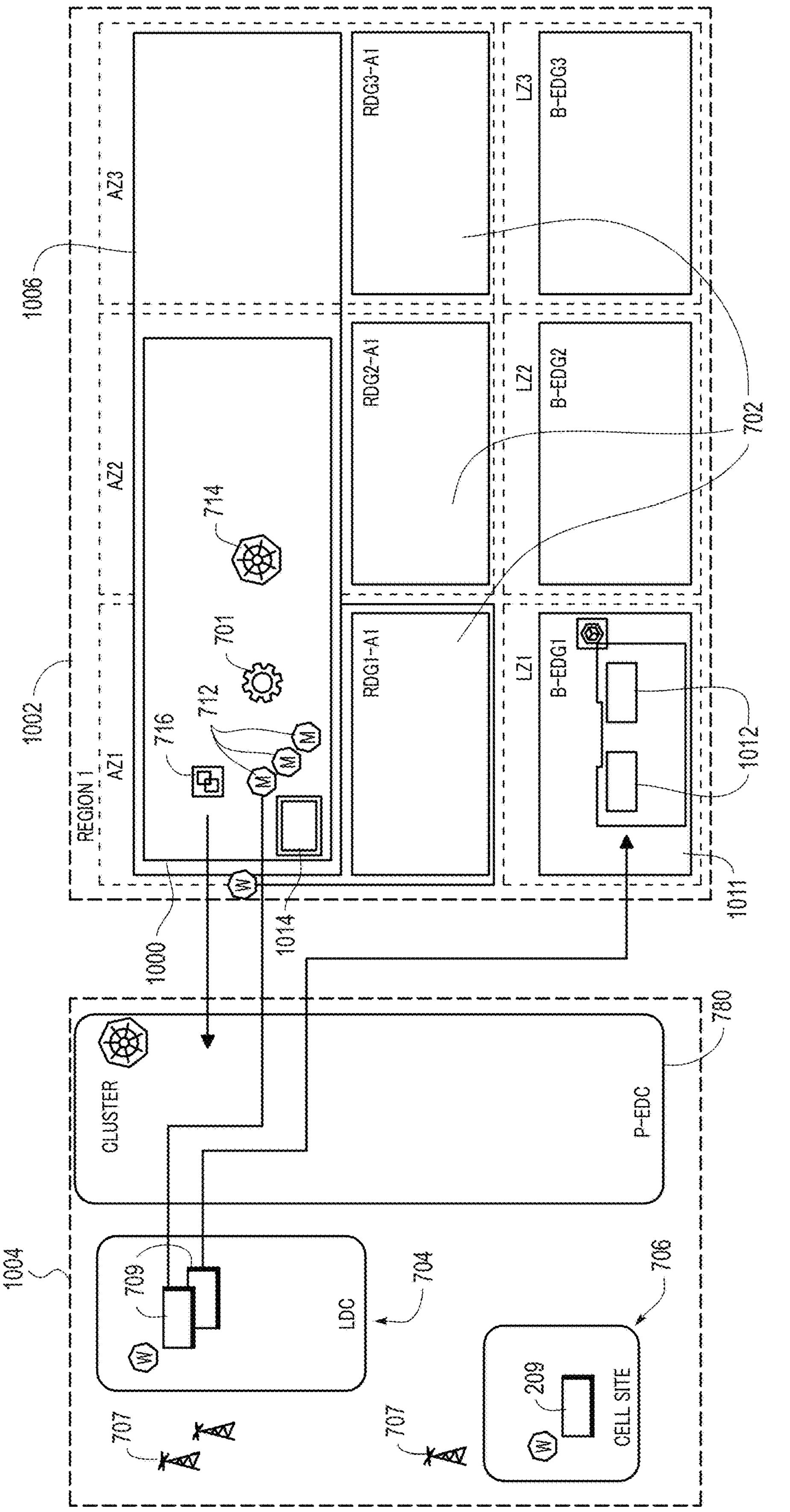
FIG. 10 illustrates a block diagram of stretching the clusters from a public network to a private network, according to various embodiments.

FIG. 10 illustrates a block diagram of stretching the containerized applications (e.g., Kubernetes clusters) from a public network to a private network and across the availability zones, according to various embodiments.

This is done by the automation platform module 701 creating master modules 712 in the control plane 1000 located within the public network 1002. The containerized applications (e.g., Kubernetes clusters) are then created as explained above but are created in both private networks 1004 and public networks 1002.

The public network 1002 shown in FIG. 10 shows that there are three availability zones AZ1, AZ2 and AZ3. These three availability zones AZ1, AZ2 and AZ3 are in three different geographical areas. For example, AZ1 may be in the western area of the US, AZ2 may be in the Midwestern area of the US, and AZ3 may be in the east coast area of the US. An exemplary availability zone AZ is illustrated in in FIG. 1, which is a block diagram of an embodiment of the present disclosure, A national data center (NDC) 1006 is shown as deployed over all three availability zones AZ1, AZ2 and AZ3 and the workloads will be distributed over these three availability zones AZ1, AZ2 and AZ3. It is noted that the NDC 1006 is a logical creation of the data center instead of a physical creation over these zones. The NDC 1006 is similar to the RDC 702 but instead of being regional, it is stretched nationally across all availability zones.

It is noted that the control plane 1000 stretches across availability zones AZ1 and AZ2 but could be stretched over all three availability zones AZ1, AZ2 and AZ3. If one of the zones fails, the control plane 1000 would automatically be deployed on the other zone. For example, if zone AZ1 fails, the control plane 1000 would automatically be deployed on AZ2. This is because each of the software programs which are deployed on one zone are also deployed in the other zone and are synced together so that when one zone fails, the duplicate started software automatically takes over. This creates significant stability.

Moreover, because the communication is to and from a private network, the communications between the public and private networks may be performed by pre-authorizing the modules on the public network to communicate with the private network.

The private network 1004 includes the LDC 704 and cell sites 706 as well as an extended data center (EDC) 780. The LDC 704 and cell sites 706 interact with the EDC 780 as the EDC 780 acts a router for the private network 1004. The EDC 780 is configured to have a concentration point where the private network 1004 will extend from. All of the LDCs 704 and cell sites 706 connect to only the EDC 780 so that all of the communications to the private network 1004 can be funneled through one point.

The master modules 712 control the DUs so that the clusters are properly allowing communications between the private network 1004 and the public network 1002. There are multiple master modules 712 so that if one master module fails, one of the other master modules takes over. For example, as shown in FIG. 10, there are three master modules 712 and all three are synced together so that if one fails, the other two are already synced together to automatically become the controlling master.

Each of the master modules 712 performs the functions of discussed above, including creating and managing the DUs 709. This control is shown over path B which extends from a master module 712 to each of the DUs 709. In this regard, the control and observability of the DUs 709 occurs only in the public network 1002 and the DUs and the clusters are in a private network 1004.

There is also a module for supporting functions and PaaS 1014 (the support module 1014). There are some supporting functions that are required for observability and this support module 1014 will provide such functions. The support module 1014 manages all of the DUs from an observability standpoint to ensure it is running properly and if there are any issues with the DUs, notifications will be provided. The support module 1014 is provided on the public network 1002 to monitor any of the DUs 709 across any of the availability zones.

The master modules 712 thus create and manage the Kubernetes clusters and create the DUs 709 and the support module 1014, and the support module 1014 then supports the DUs 709. Once the DUs 709 are created, they run independently, but if a DU fails (as identified by the support module 1014) then the master module 712 can restart the DU 709.

Once the software (e.g., clusters, DUs 709, support module 1014, master module 712, etc.) is set up and running, the user voice and data communications received at the towers 707 and is sent over the path of communication A so that the voice and data communications is transmitted from tower 707, to a DU 709, and then to the CU 1012 in a EKS cluster 1011. This path of communication A is separate from the path of communication B for management of the DUs for creation and stability purposes.

Figure 11:
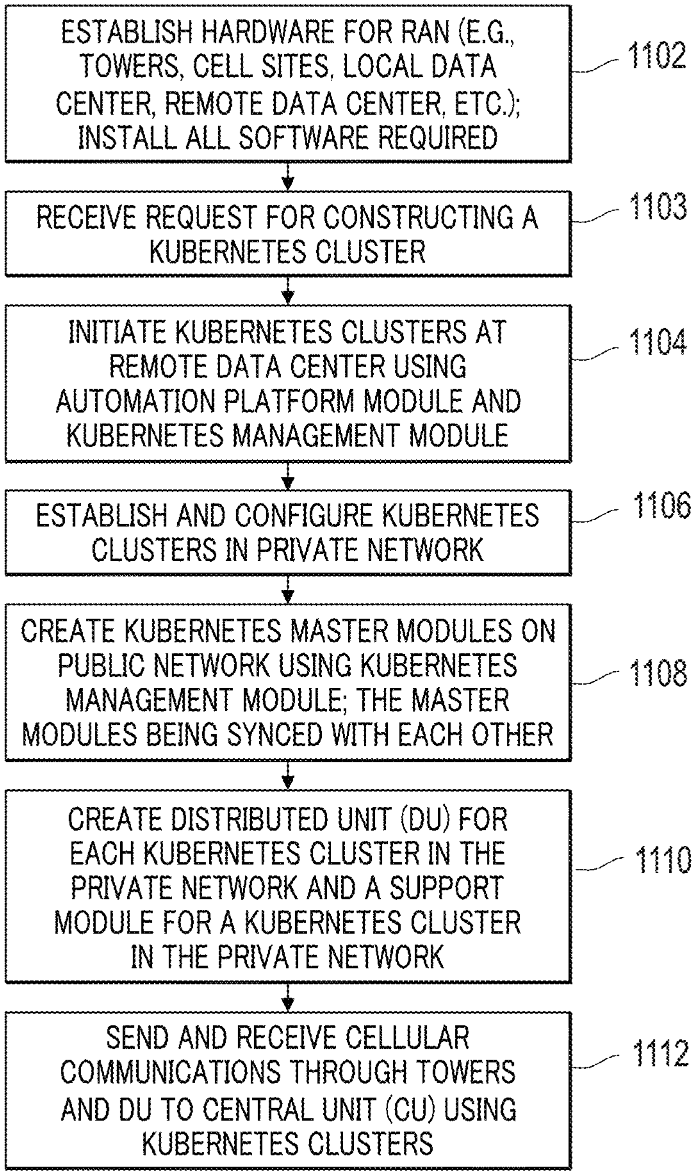
FIG. 11 illustrates a method of establishing cellular communications using clusters stretched from a public network to a private network.

FIG. 11 illustrates a method of establishing cellular communications using containerized applications (e.g., Kubernetes clusters) stretched from a public network to a private network. Blocks 1102, 1103 and 1104 of FIG. 11 are similar to Blocks 902, 904 and 906 of FIG. 9.

Block 1106 of FIG. 11 is also similar to 908 of FIG. 9 except that the containerized applications (e.g., Kubernetes clusters) will be established on the private network from the public network. The containerized applications (e.g., Kubernetes clusters) can also be established on the public network as well. To establish the containerized applications on the private network, the private network allows a configuration module on the public network to access the private network servers and to install the workers on the operating systems of the servers.

In block 1108, master modules are created on the public network as explained above. One of the master modules controls the workers on the private network. As discussed above, the master modules are all synced together.

In block 1110, the DUs are created for each of the containerized applications (e.g., Kubernetes clusters) on the private network. This is accomplished by the active master module installing the DUs from the public network. The private network allows the active master module access to the private network for this purpose. Once the DUs are installed and configured to the RRUs and the corresponding towers, the DUs then can relay communications between the towers and the CU located on the public network.

Also in block 1110, the support module is created on the public network and is created by the active master module. This support module provides the functions as established above and the private network allows access thereto for such support module to monitors each of the DUs on the private network.

Last, block 1112 of FIG. 11 is similar to block 914 of FIG. 9. However, the communications proceed along path A in FIG. 10 as explained above and the management and monitoring of the DUs is performed along the Kubernetes clusters along path B.

Observability

While the network is running, the support module will collect various data to ensure the network is running properly and efficiently. This observability framework (OBF) collects telemetry data from all network functions that will enable the use of artificial intelligence and machine learning to operate and optimize the cellular network.

This adds to the telecom infrastructure vendors that support the RAN and cloud-native technologies as a provider of Operational Support Systems (OSS) services. Together, these OSS vendors will aggregate service assurance, monitoring, customer experience and automation through a singular platform on the network.

The OBF brings visibility into the performance and operations of the network's containerized network functions (CNFs). This collected data will be used to optimize networks through its Closed Loop Automation module, which executes procedures to provide automatic scaling and healing while minimizing manual work and reducing errors.

Figure 12:
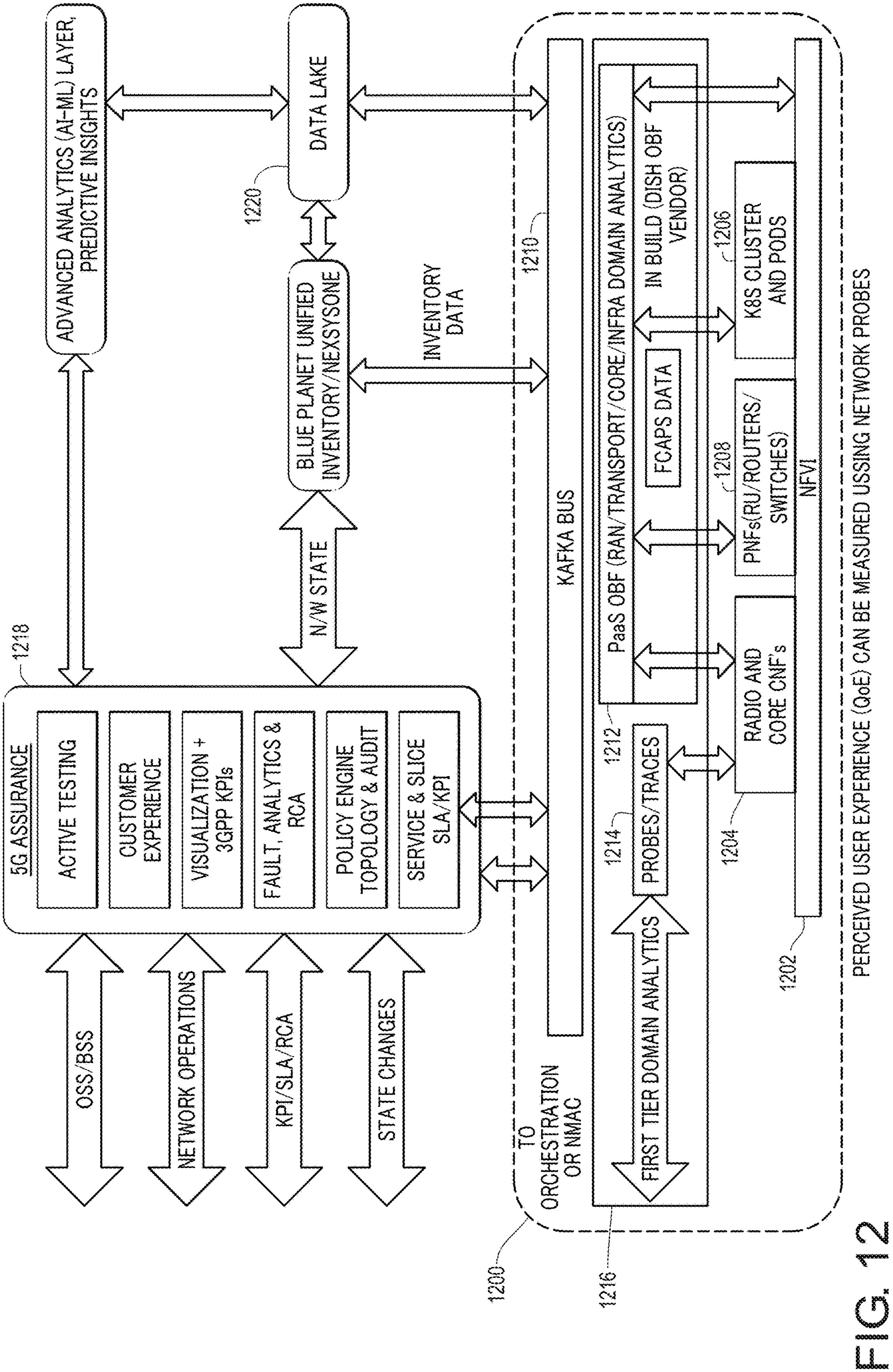
FIG. 12 illustrates a system with a centralized observability framework, according to various embodiments.

This is shown in FIG. 12, which is described below.

FIG. 12 illustrates the network described above but also explains how data is collected according to various embodiments. The system 1200 includes the networked components 1202-1206 as well as the observability layers 1210-1214.

First, a network functions virtualization infrastructure (NFVI) 1202 encompasses all of the networking hardware and software needed to support and connect virtual network functions in carrier networks. This includes the cluster creation as discussed herein.

On top of the NFVI, there are various domains, including the Radio (or RAN) and Core CNFs 1204, clusters (e.g., Kubernetes clusters) and pods (or containers) 1206 and physical network functions (PNFs) 1208, such as the RU, routers, switches and other hardware components of the cellular network. These domains are not exhaustive and there may be other domains that could be included as well.

The domains transmit their data using probes/traces 1214 to a common source, namely a Platform as a Server (PaaS) OBF layer 1212. The PaaS OBF layer 1212 may be located within the support module on the public network so that it is connected to all of the DUs and CU to pull all of the data from the RANs and Core CNFs 1204. As such all of the data relating to the RANs and Core CNFs 1204 are retrieved by the same entity deploying and operating the each of the DUs of the RANs as well as the operator of the Core CNFs. In other words, the data and observability of these functions do not need to be requested from vendors of these items and instead are transmitted to the same source which is running these functions, such as the administrator of the cellular network.

The data retrieved are key performance indicators (KPI) and alarms/faults. KPI are the critical indicators of progress toward performing cellular communications and operations of the cellular network. KPIs provides a focus for strategic and operational improvement, create an analytical basis for decision making and help focus attention on what matters most. Performing observability with the use of KPIs includes setting targets (the desired level of performance) and tracking progress against that target.

The PaaS OBF and data bus (e.g., Kafka bus) retrieves the distributed data collection system so that such data can be monitored. This system uses the containerized application (e.g., Kubernetes cluster) structure, uses a data bus such as Kafka as an intermediate node of data convergence, and finally uses data storage for storing the collected and analyzed data.

In this system, the actual data collection tasks may be divided into two different functions. First the PaaS OBF is responsible for collecting data from each data domain and transmitting it to data bus and then, the data bus is responsible for persistent storage of data collected from data consumption after aggregation. The master is responsible for maintaining the deployment of the PaaS OBF and data bus and monitoring the execution of these collection tasks.

It should be noted that a data bus may be any data bus but in some embodiments, the data bus is a Kafka bus but the present invention should not be so limited. Kafka may be used herein simply as illustrative examples. Kafka is currently an open source streaming platform that allows one to build a scalable, distributed infrastructure that integrates legacy and modern applications in a flexible, decoupled way.

The PaaS OBF performs the actual collection task after registering with the master module. Among the tasks, the PaaS OBF aggregates the collected data into the Kafka bus according to the configuration information of the task, and stores the data in specified areas of the Kafka bus according to the configuration information of the task and the type of data being collected.

Specifically, when PaaS OBF collects data, it needs to segment data by time (e.g., data is segmented in hours), and the time segment information where data is located is written as well as the collected data entity in the data bus. In addition, because the collected data is stored in the data bus in the original format, other processing systems can transparently consume the data in the data bus without making any changes.

In the process of executing the actual collection task, the PaaS OBF also needs to maintain the execution of the collection task, and regularly reports it to the specific data bus, waiting for the master to pull and cancel the consumption. By consuming the heartbeat data reported by the slave in Kafka (for example), the master can monitor the execution of the collection task of the PaaS OBF and the data bus.

As can be seen, all of the domains are centralized in a single layer PaaS OBF 1212. If some of the domains are provided by some vendors and other by other vendors and these vendors would typically collect data at their networks, the PaaS OBF collects all of the data over all vendors and all domains in a single layer PaaS OBF 1212 and stores the data in a centralized long term storage using the data bus. This data is all accessible to the system at a centralized database or centralized network, such as public network 1002 discussed above with regard to FIG. 10. Because all of the data is stored in one common area from various different domains and even from products managed by different vendors, the data can then be utilized in a much more efficient and effective manner.

After the data is collected across multiple domains, the data bus (e.g., Kafka) is used to make the data available for all domains. Any user or application can receive data to the data bus to retrieve data relevant to thereto. For example, a policy engine from a containerized application such as a Kubernetes cluster may not be getting data from the Kafka bus, but through some other processing, it indicates that may need to receive data from the Radio and Core CNF domain so it can start pulling data from the Kafka bus or data lake on its own.

It should be known that any streaming platform bus may be used and the Kafka bus is used for ease of illustration of the invention and the present invention should not be limited to such a Kafka bus.

Kafka is unique because it combines messaging, storage and processing of events all in one platform. It does this in a distributed architecture using a distributed commit log and topics divided into multiple partitions.

With this distributed architecture, the above-described data bus is different from existing integration and messaging solutions. Not only is it scalable and built for high throughput but different consumers can also read data independently of each other and in different speeds. Applications publish data as a stream of events while other applications pick up that stream and consume it when they want. Because all events are stored, applications can hook into this stream and consume as required—in batch, real time or near-real-time. This means that one can truly decouple systems and enable proper agile development. Furthermore, a new system can subscribe to the stream and catch up with historic data up until the present before existing systems are properly decommissioned. The uniqueness of having messaging, storage and processing in one distributed, scalable, fault-tolerant, high-volume, technology-independent streaming platform provides an advantage over not using the above-described data bus extending over all layers.

There are two types of storage areas shown in FIG. 12 for collection of the data. The PaaS OBF is the first data storage 1216. In this regard, the collection of data is short term storage by collecting data on a real time basis on the same cloud network where the core of the RAN is running and where the master modules are running (as opposed to collecting the data individually at the vendor sites). Here, the data is centralized for short term storage, as described above.

Then, the second data storage is shown as box 1218, which is longer term storage on the same cloud network as the first data storage 1216 and the core of the RAN. This second data storage allows data that can be used by any applications without having to request the data on a database or network in a cloud separate from the core and master modules.

There are other storage types as well such as a data lake 1220 which provides more of a permanent storage for data history purposes.

It should be noted that the data collected for all storage types are centralized to be stored on the public network, such as the public network 1002 discussed above with regard to FIG. 10.

Figure 13:
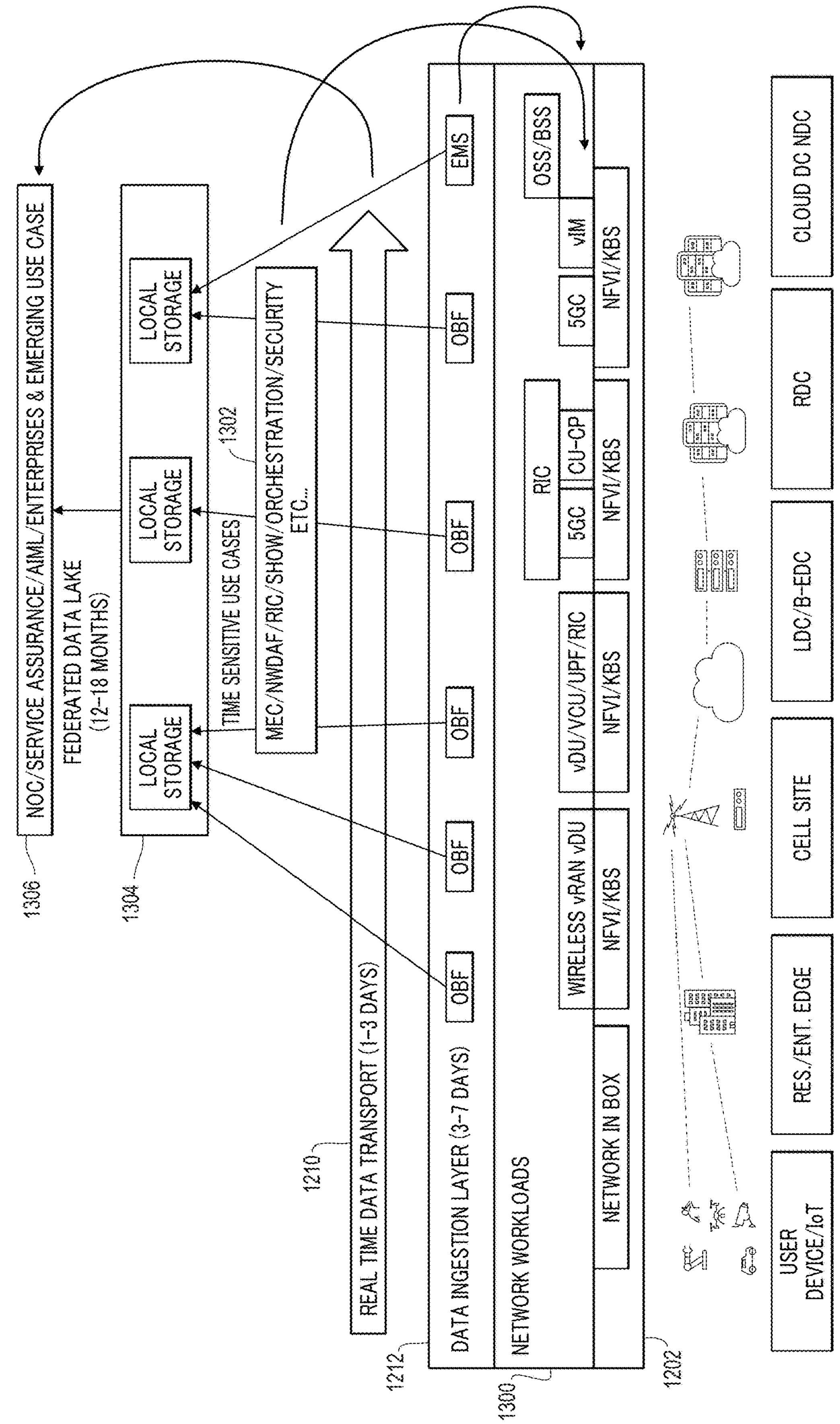
FIGS. 13 and 14 illustrate an overall architecture of an observability framework, according to various embodiments.
Figure 14:
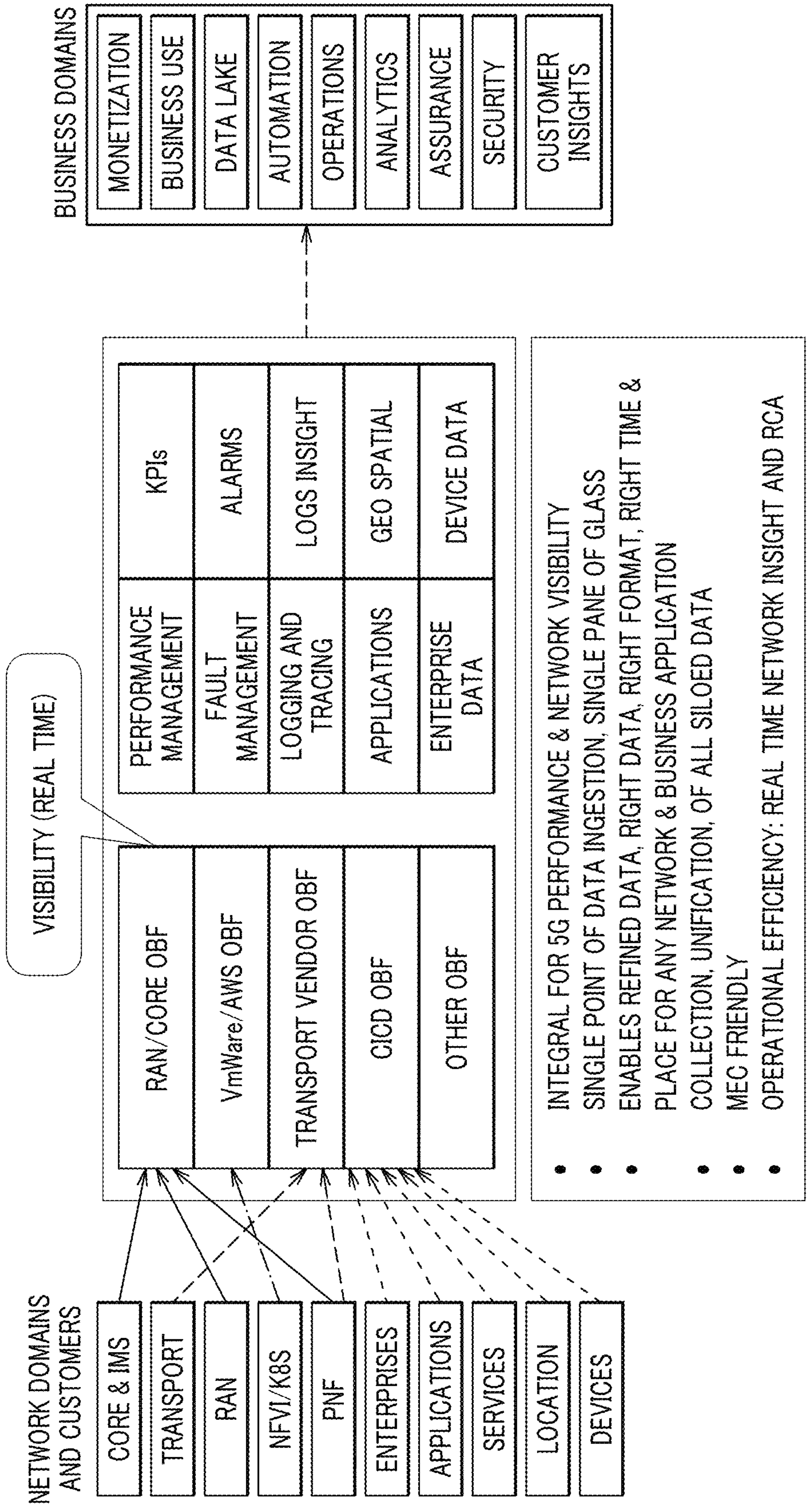

FIGS. 13 and 14 show an overall architecture of the OBF as well as the layers involved. First, in FIG. 13, there are three layers shown: the PaaS OBF layer 1212, the Kafka layer 1210 and the storage layer 1304. There are time sensitive use applications 1302 which use the data directly from the data bus for various monitoring and other applications which need data on a more real-time basis, such as MEC, security, orchestration, etc. Various applications may pull data from the PaaS OBF layer since this is a real-time data gathering.

There are other use cases 1306 that can obtain data either from the PaaS OBF layer 1212, the data bus layer 1210 and the storage layer 1304, depending on the applications. Some applications may be NOC, service reassurance, AIML, enterprises, emerging use, etc.

As shown in FIG. 13, there are more details on various domains 1300, such as cell sites (vDU, vRAN, etc.), running on the NFVI 1202 layer. Also, as shown, the NFVI receives data from various hardware devices/sites, such as from cell sites, user devices, RDC, etc.

In FIG. 14, the network domains and potential customers/users are shown on the left with core and IMS, transport, RAN, NFC/Kubernetes (K8S), PNF, enterprises, applications, services, location, and devices. All of these domains are collected in one centralized location using various OBF collection means. For example, data from the core and IMS, RAN, and NFC/Kubernetes domains are collected using the RAN/Core OBF platform of the PaaS layer 1212. Also, data from the RAN and PNF domains are collected on the transport OBF layer. In any event, all of the data from the various domains and systems, whether or not there are multiple entities/vendors managing the domains, are collected at a single point or single database and on a common network/server location. This allows the applications (called "business domains" in the right hand side of FIG. 14) to have a single point of contact to retrieve whatever data is needed for those applications, such as security, automation, analytics, assurance, etc.

Although specific embodiments were described herein, the scope of the invention is not limited to those specific embodiments. The scope of the invention is defined by the following claims and any equivalents therein.

As will be appreciated by one skilled in the art, aspects of the present disclosure may be embodied as a system, a method or a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a radio access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the FIGS. illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For v, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

What is claimed is:

1. A method implemented on a public cloud of a cellular network, the method comprising:

generating a repository on the public cloud, the repository being configured to receive a plurality of templates;

receiving the plurality of templates in the repository, each template defining at least one network function;

acquiring, from each of the plurality of templates, data that defines the at least one network function with respect to infrastructure of at least one cloud platform of a plurality of cloud platforms;

generating a standardized template based on the data acquired from the plurality of templates, wherein the standardized template contains target data that defines the at least one network function with respect to the infrastructure of the at least one cloud platform and code for deploying the at least one network function onto the at least one cloud platform within the public cloud, the plurality of cloud platforms being different from each other, wherein the standardized template is generated by an application running on a radio access network (RAN) node of the cellular network, and wherein the RAN node includes (i) a central unit (CU) that resides on the public cloud of the cellular network, (ii) a distributed unit (DU) that resides on a private cloud of the cellular network such that the DU is in communication with the CU on the public cloud of the cellular network, and (iii) a radio unit (RU) under control of the DU;

receiving a request to deploy the at least one network function onto a cloud platform of the plurality of cloud platforms;

acquiring, from the standardized template, the target data that defines the at least one network function with respect to the infrastructure of the at least one cloud platform; and deploying the at least one network function onto the cloud platform based on the target data that defines the at least one network function.

2. The method according to claim 1, wherein the cellular network is a 5G cellular network.

3. The method according to claim 1, wherein the standardized template is cloud agnostic.

4. The method according to claim 3, further comprising:

designing the standardized template containing the data that defines the at least one network function for deployment of the at least one network function on a first cloud platform; and designing the standardized template containing the data that defines the at least one network function for deployment of the at least one network function on a second cloud platform, which is different from the first cloud platform.

5. The method according to claim 1, further comprising:

generating the standardized template by integrating the at least one network function into a single pipeline that is configured to connect to any of the plurality of cloud platforms, the plurality of cloud platforms comprising a first cloud platform and a second cloud platform;

deploying the at least one network function onto the first cloud platform via the single pipeline; and deploying the at least one network function onto the second cloud platform via the single pipeline, the second cloud platform being different from the first cloud platform.

6. The method according to claim 1, wherein the at least one network function is a containerized network function.

7. The method according to claim 1, wherein received requests include requests to deploy different types of network functions.

8. The method according to claim 7, wherein the network functions comprise at least one of a voice service; a Short Messaging Service (SMS); a video streaming service; and a voice messaging service.

9. A cellular network comprising:

radio access network (RAN) nodes where each RAN node includes (i) a central unit (CU) that resides on a public cloud of the cellular network, (ii) a distributed unit (DU) that resides on a private cloud of the cellular network such that the DU is in communication with the CU on the public cloud of the cellular network, and (iii) a radio unit (RU) under control of the DU; and applications configured to run on the RAN node of the cellular network, wherein the public cloud comprises cloud servers with processors and stores computer-executable instructions that execute a process comprising:

generating a repository on the public cloud, the repository being configured to receive a plurality of templates;

receiving the plurality of templates in the repository, each template defining at least one network function;

acquiring, from each of the plurality of templates, data that defines the at least one network function with respect to infrastructure of at least one cloud platform of a plurality of cloud platforms;

generating a standardized template based on the data acquired from the plurality of templates, wherein the standardized template contains target data that defines the at least one network function with respect to the infrastructure of the at least one cloud platform and code for deploying the at least one network function onto the at least one cloud platform within the public cloud, the plurality of cloud platforms being different from each other, and wherein the standardized template is generated by an application running on the RAN node of the cellular network;

receiving a request to deploy the at least one network function onto a cloud platform of the plurality of cloud platforms;

acquiring, from the standardized template, the target data that defines the at least one network function with respect to the infrastructure of the at least one cloud platform; and deploying the at least one network function onto the cloud platform based on the target data that defines the at least one network function.

10. The cellular network according to claim 9, wherein the cellular network is a 5G network.

11. The cellular network according to claim 9, wherein the standardized template is cloud agnostic.

12. The cellular network according to claim 11, the process further comprising:

designing the standardized template containing the data that defines the at least one network function for deployment of the at least one network function on a first cloud platform; and designing the standardized template containing the data that defines the at least one network function for deployment of the at least one network function on a second cloud platform, which is different from the first cloud platform.

13. The cellular network according to claim 9, the process further comprising:

generating the standardized template by integrating the at least one network function into a single pipeline that is configured to connect to any of the plurality of cloud platforms, the plurality of cloud platforms comprising a first cloud platform and a second cloud platform;

deploying the at least one network function onto the first cloud platform via the single pipeline; and deploying the at least one network function onto the second cloud platform via the single pipeline, which is different from the first cloud platform.

14. The cellular network according to claim 9, wherein the at least one network function is a containerized network function.

15. The cellular network according to claim 9, wherein received requests include requests to deploy different types of network functions.

16. The cellular network according to claim 15, wherein the network functions comprise at least one of a voice service; a Short Messaging Service (SMS); a video streaming service; and a voice messaging service.

17. A cellular network comprising:

radio access network (RAN) nodes where each RAN node includes (i) a central unit (CU) that resides on a public cloud of the cellular network, (ii) a distributed unit (DU) that resides on a private cloud of the cellular network such that the DU is in communication with the CU on the public cloud of the cellular network, and (iii) a radio unit (RU) under control of the DU; and applications configured to run on the RAN node of the cellular network, wherein the public cloud comprises cloud servers with processors and stores computer-executable instructions that execute a process comprising:

generating a repository on the public cloud, the repository being configured to receive a plurality of first templates, wherein each of the first templates respectively defines at least one network function with respect to infrastructure of at least one cloud platform of a plurality of cloud platforms, and wherein each of the first templates respectively contains data for deploying the at least one network function onto the at least one cloud platform of the plurality of cloud platforms;

analyzing the plurality of first templates to identify specific data required for deploying the at least one network function;

acquiring, from each of the plurality of first templates, the specific data for deploying the at least one network function;

generating a second template containing target data that defines the at least one network function with respect to the infrastructure of the at least one cloud platform and code for deploying the at least one network function onto a plurality of different cloud platforms within the public cloud, the second template being a standardized template derived from the specific data acquired from the first templates and defining the at least one network function with respect to the infrastructure of each of the plurality of cloud platforms, respectively, wherein the second template is generated by an application running on the RAN node of the cellular network;

receiving a request to deploy the at least one network function of the network functions onto a cloud platform of the plurality of cloud platforms;

acquiring, from the second template, the target data that defines the at least one network function with respect to the infrastructure of the at least one cloud platform; and deploying the at least one network function onto the cloud platform based on the target data that defines the at least one network function.

18. The cellular network according to claim 17, wherein the cellular network is a 5G network.

* * * * *